United States Patent
Puente Pestaña et al.

(10) Patent No.: US 12,224,944 B2
(45) Date of Patent: Feb. 11, 2025

(54) NODES AND METHODS FOR ENABLING USER PLANE TRAFFIC CLASSIFICATION IN A COMMUNICATIONS SYSTEM

(71) Applicant: Telefonaktiebolaget LM Ericsson (publ), Stockholm (SE)

(72) Inventors: Miguel Angel Puente Pestaña, Madrid (ES); Miguel Angel Muñoz De La Torre Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 463 days.

(21) Appl. No.: 17/772,394

(22) PCT Filed: Nov. 19, 2019

(86) PCT No.: PCT/EP2019/081721
§ 371 (c)(1),
(2) Date: Apr. 27, 2022

(87) PCT Pub. No.: WO2021/083534
PCT Pub. Date: May 6, 2021

(65) Prior Publication Data
US 2022/0393984 A1 Dec. 8, 2022

(30) Foreign Application Priority Data

Oct. 30, 2019 (EP) .................................. 19382949

(51) Int. Cl.
*H04L 47/2441* (2022.01)
*H04L 47/20* (2022.01)
*H04L 47/2483* (2022.01)

(52) U.S. Cl.
CPC .......... *H04L 47/2441* (2013.01); *H04L 47/20* (2013.01); *H04L 47/2483* (2013.01)

(58) Field of Classification Search
None
See application file for complete search history.

(56) References Cited

U.S. PATENT DOCUMENTS

| 10,412,625 B1 | 9/2019 | Yan et al. |
| 10,448,268 B1 | 10/2019 | Jaya et al. |

(Continued)

FOREIGN PATENT DOCUMENTS

CN 110087331 A 8/2019

OTHER PUBLICATIONS

3GPP, "3rd Generation Partnership Project; Technical Specification Group Services and System Aspects; Architecture enhancements for control and user plane separation of EPC nodes; Stage 2 (Release 16)", 3GPP TS 23.214 V16.0.0, Jun. 2019, 1-92.

(Continued)

*Primary Examiner* — Robert M Morlan
(74) *Attorney, Agent, or Firm* — Weisberg I.P. Law, P.A.

(57) ABSTRACT

The embodiments herein relate to a method performed by a PCF node (101) for enabling user plane traffic classification in a communications system (100) supporting CUPS with multiple UPF nodes (105). The PCF node receives, from a SMF node (103), a policy request for a UE (114). The PCF node (101) obtains, from a UDR (108), an indicator indicating COMU for the UE (114), and transmits, to the SMF node (103), a policy response comprising the indicator indicating COMU.

20 Claims, 11 Drawing Sheets

(56) References Cited

U.S. PATENT DOCUMENTS

| | | | |
|---|---|---|---|
| 2019/0082417 A1* | 3/2019 | Bolle | H04W 28/0268 |
| 2019/0158985 A1 | 5/2019 | Dao et al. | |
| 2019/0215724 A1 | 7/2019 | Talebi Fard et al. | |
| 2019/0254118 A1 | 8/2019 | Dao et al. | |
| 2020/0275302 A1* | 8/2020 | Youn | H04W 28/24 |
| 2022/0304111 A1* | 9/2022 | Talebi Fard | H04W 80/10 |

OTHER PUBLICATIONS

3GPP, "3rd Generation Partnership Project; Technical Specification Group Core Network and Terminals; Interface between the Control Plane and the User Plane Nodes; Stage 3 (Release 16)", 3GPP TS 29.244 V16.0.0, Jun. 2019, 1-217.

3GPP, "3rd Generation Partnership Project; Technical Specification Group Core Network and Terminals; Interface between the Control Plane and the User Plane Nodes; Stage 3 (Release 16)", 3GPP TS 29.244 V16.1.0, Sep. 2019, 1-243.

3GPP, "3rd Generation Partnership Project; Technical Specification Group Services and System Aspects; System Architecture for the 5G System (5GS); Stage 2 (Release 16)", 3GPP TS 23.501 V16.2.0, Sep. 2019, 1-391.

Nichols, K., et al., "Definition of the Differentiated Services Field (DS Field) in the IPv4 and IPv6 Headers", IETF RFC 2474, Network Working Group, Obsoletes: 1455, 1349, Category: Standards Track Torrent Networking, Dec. 1998, 1-20.

Unknown, Author, "Detection of 'Downlink data delivery status' and 'Availability after DDN Failure' events", Nokia; 3GPP TSG-SA WG2 Meeting #134 S2-1906945, Sapporo, Japan, Jun. 24-28, 2019, 1-4.

Unknown, Author, "Discussion on UPF architecture and interconnection to PCF, SMF", Sandvine, Inc; SA WG2 Meeting #S2-119 S2-171203, Dubrovnik, Croatia, Feb. 13-17, 2017, 1-14.

\* cited by examiner

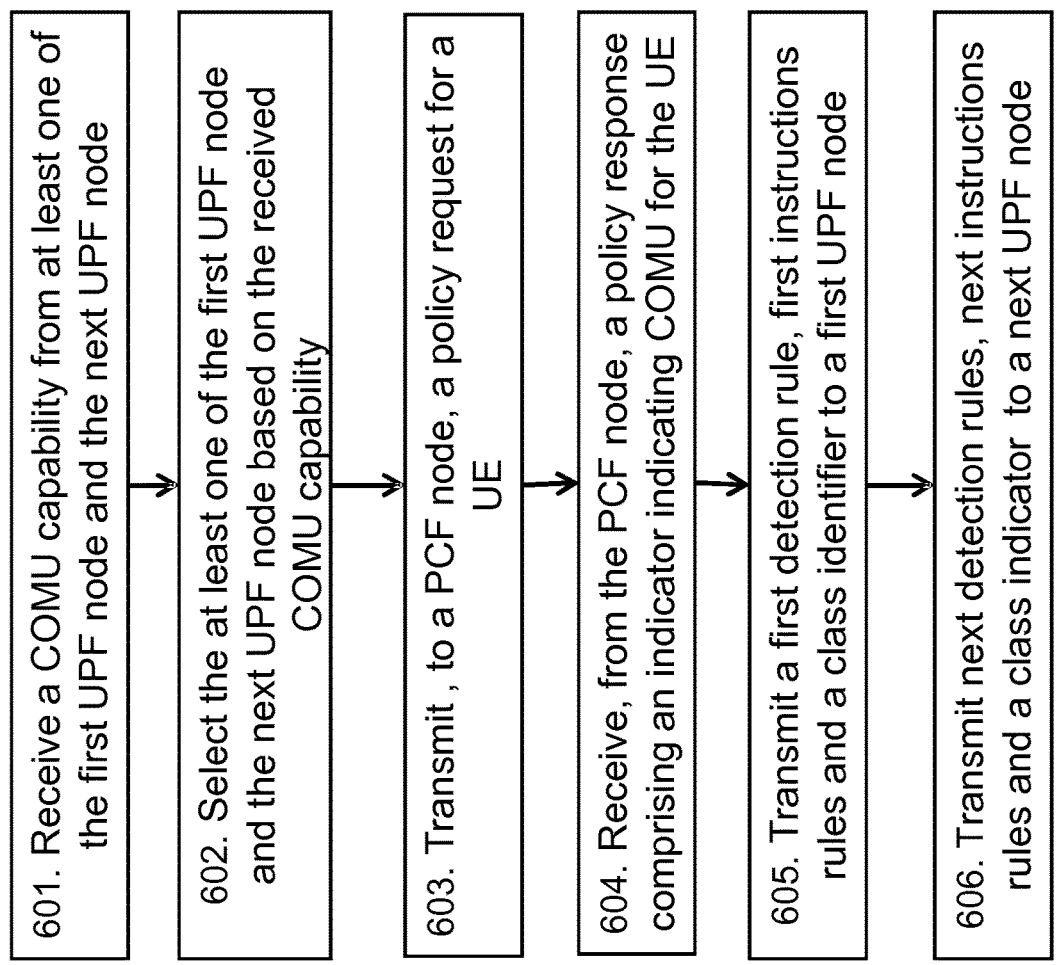

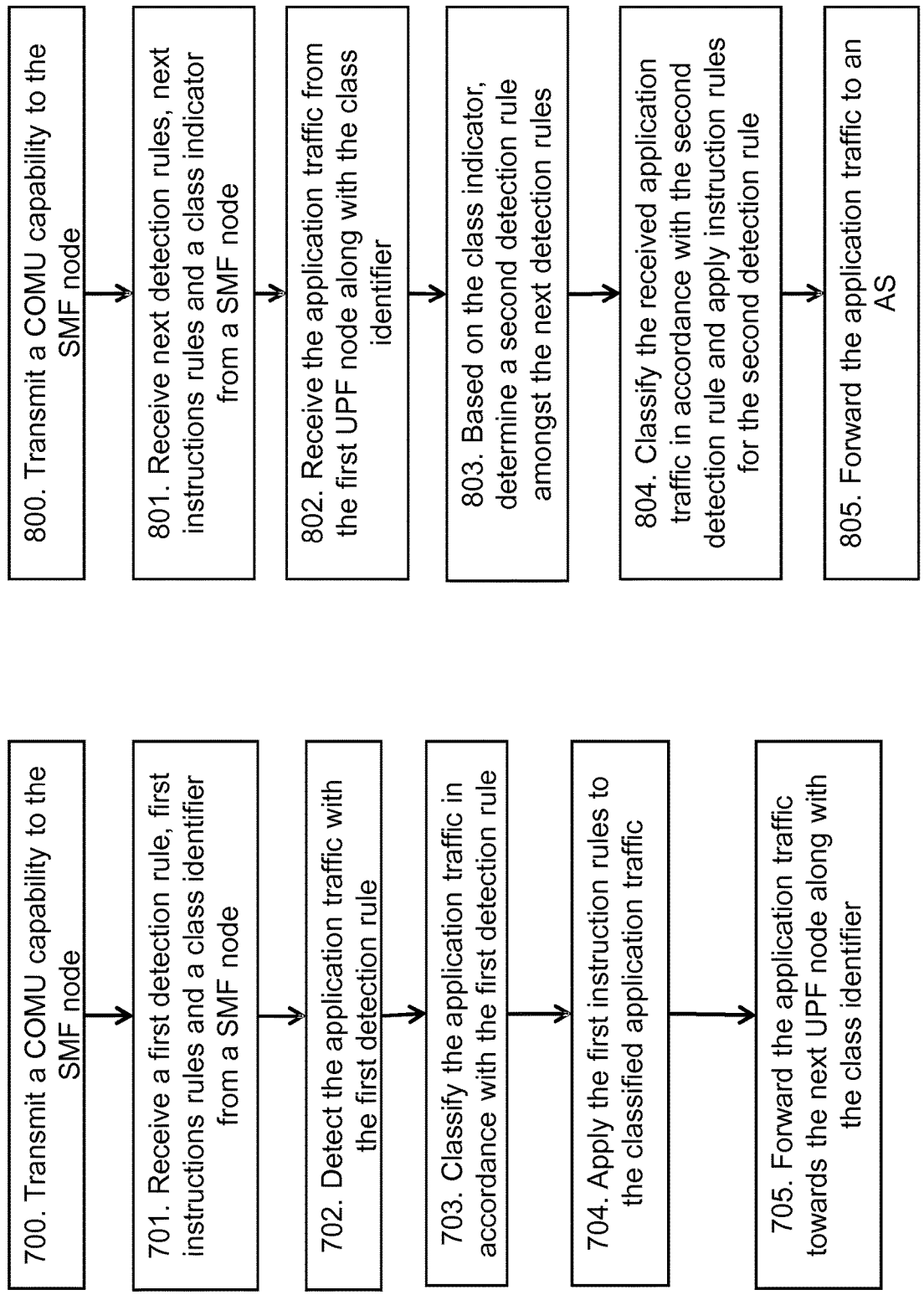

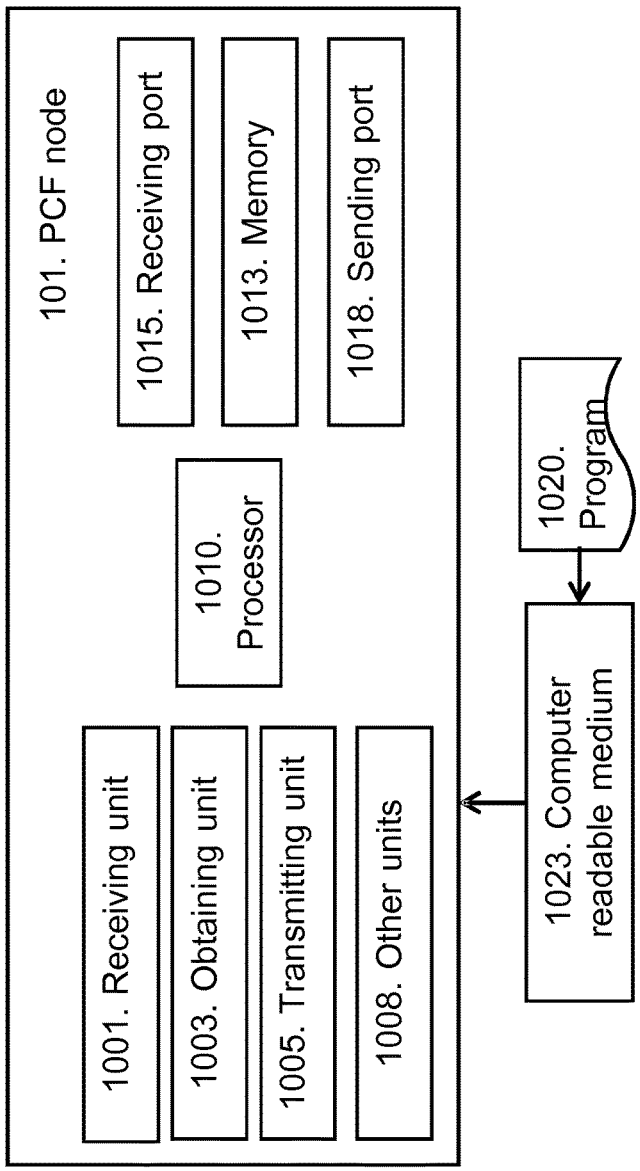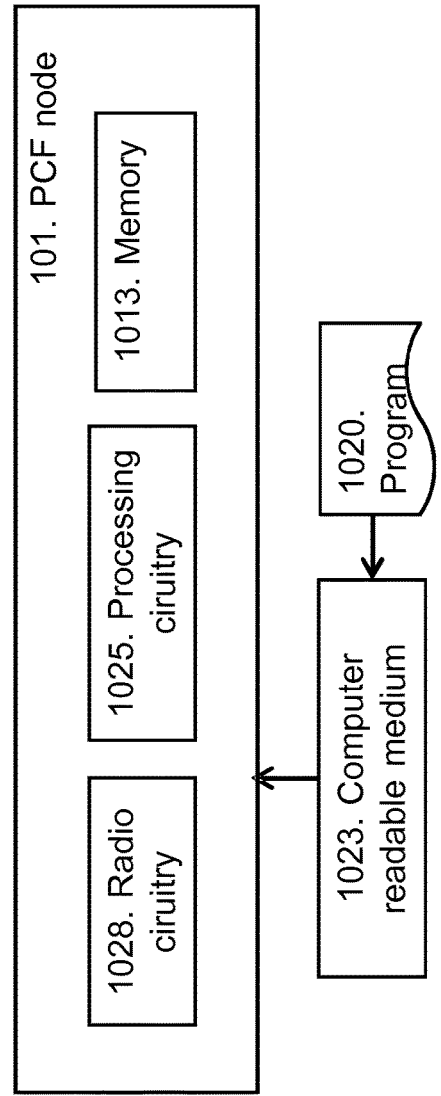
Fig. 100a
Fig. 100b

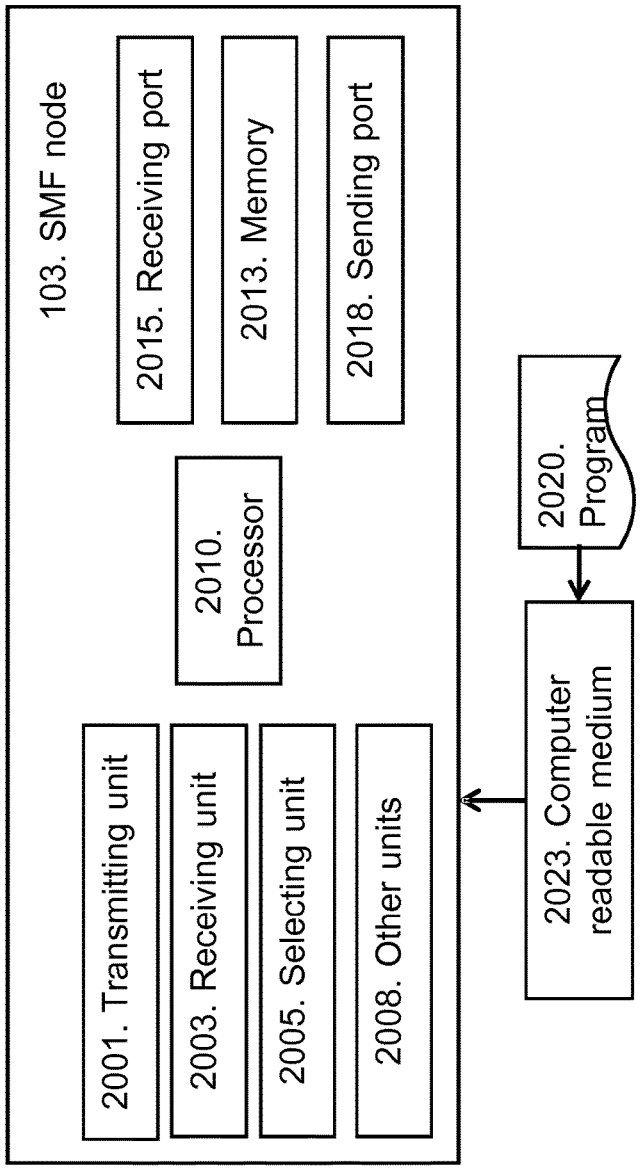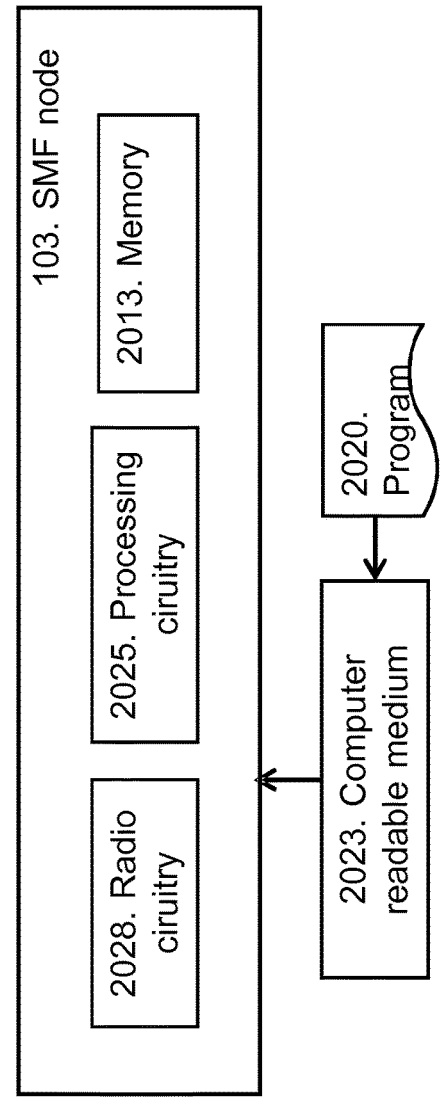
Fig. 200a
Fig. 200b

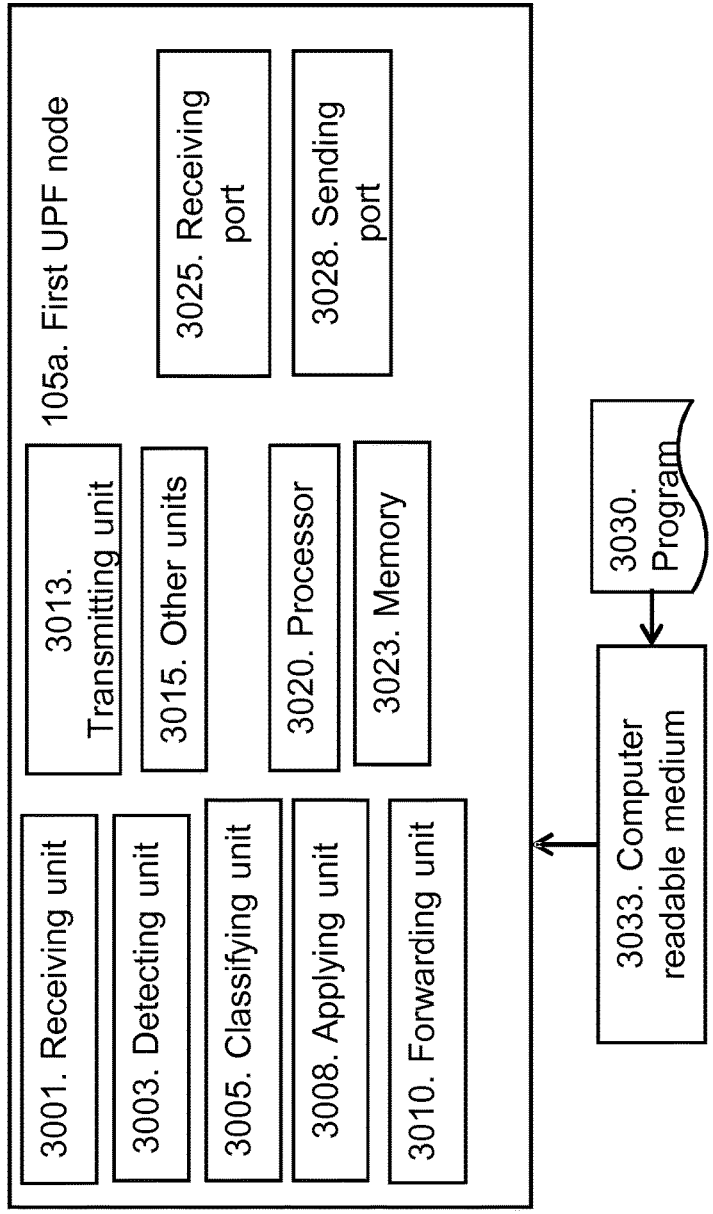
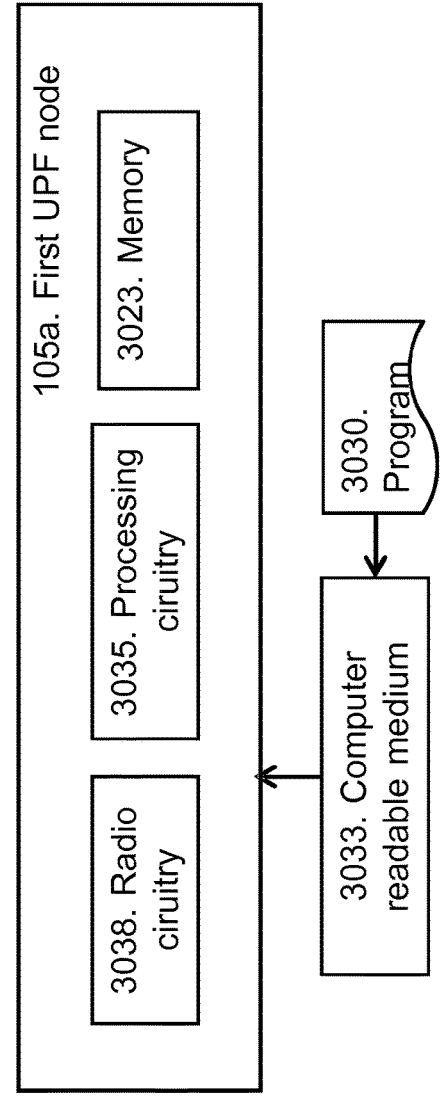
Fig. 300a
Fig. 300b

NODES AND METHODS FOR ENABLING USER PLANE TRAFFIC CLASSIFICATION IN A COMMUNICATIONS SYSTEM

TECHNICAL FIELD

The present disclosure relate generally to a Policy Control Function (PCF) node, a method performed by the PCF node, a Session Management Function (SMF) node, a method performed by the SMF node, a first User Plane Function (UPF) node, a method performed by the first UPF node, a next UPF node and a method performed by the next UPF node.

More particularly the present disclosure relate to enabling user plane traffic classification in a communications system supporting Control and User Plane Separation (CUPS) with multiple UPF nodes

BACKGROUND

Third Generation Partnership Project (3GPP) Fifth Generation Core Network (5GC) was introduced in the 3GPP release number 15. FIG. 1 illustrates a 3GPP 5GC network architecture in a service-based representation. The 5G network architecture comprises at least the following network functions (NF):
PCF 101
SMF 103
UPF 105
Unified Data Repository (UDR) 108
Network Exposure Function (NEF) 110
Network Data Analytics Function (NWDAF) 113
Access and Mobility Management Function (AMF) 115
Application Function (AF) 118
CHarging Function (CHF) 120
FIG. 1 shows the following service-based interfaces:
Nudr: Service-based interface exhibited by UDR 108
Nnef: Service-based interface exhibited by NEF 110
Nnwdaf: Service-based interface exhibited by NWDAF 113
Naf: Service-based interface exhibited by AF 118
Npcf: Service-based interface exhibited by PCF 101
Nchf: Service-based interface exhibited by CHF 120
Namf: Service-based interface exhibited by AMF 115
Nsmf: Service-based interface exhibited by SMF 103
FIG. 1 shows N4, which is a reference point between the SMF 103 and the UPF 105.

Some of the functions illustrated in FIG. 1 will now be described in more detail.

The PCF 101 supports different functionality, e.g. unified policy framework to govern network behavior, provides policy rules to Control Plane function(s) to enforce them, and accesses subscription information relevant for policy decisions in the UDR 108.

The SMF 103 supports different functionality, e.g. Session Establishment, modify and release, and policy related functionalities like termination of interfaces towards Policy control functions, Charging data collection, support of charging interfaces and control and coordination of charging data collection at the UPF 105.

The UPF 105 supports handling of user plane traffic, including packet inspection, e.g. analysis and Classification, packet routing and forwarding, including traffic steering, traffic usage reporting and Quality of Service (QoS) handling.

In 5G networks, and for a PDU session, a SMF 103 might select multiple UPFs 103. 3GPP TS 29.244 V16.1.0 (2019-09) specifies the Packet Forwarding Control Protocol (PFCP) protocol but it does not cover the following aspect: when the SMF 103 selects multiple UPFs 103 in a certain PDU session, the SMF 103 configures each UPF 103 independently, and each UPF 103 always executes a Packet Detection Rule (PDR) matching process, which is not efficient since it's a costly process that is repeated in each UPF 103.

Therefore, there is a need to at least mitigate or solve this issue.

SUMMARY

An objective is therefore to obviate at least one of the above disadvantages and to provide improved user plane traffic classification in a communications system.

According to a first aspect, the object is achieved by a method performed by a PCF node for enabling user plane traffic classification in a communications system supporting Control and User Plane Separation (CUPS) with multiple UPF nodes. The PCF node receives, from a SMF, a policy request for a User Equipment (UE). The PCF node obtains, from a UDR, an indicator indicating Classification Optimization for Multiple User plane functions (COMU) for the UE, and transmits, to the SMF node, a policy response comprising the indicator indicating COMU.

According to a second aspect, the object is achieved by a method performed by a SMF node for enabling user plane traffic classification in a communications system supporting CUPS with multiple UPF nodes. The SMF node transmits, to a PCF node, a policy request for a UE. The SMF node receives, from the PCF node, a policy response comprising an indicator indicating COMU for the UE. The SMF node transmits, to a first UPF node, a first detection rule to classify application traffic, first instructions rules to be applied to the classified application traffic and, based at least on the indicator indicating COMU, a class identifier to identify the classified application traffic towards a next UPF node. The SMF node transmits, to a next UPF node, next detection rules to classify application traffic, next instructions rules for each next detection rule and to be applied to the classified application traffic and, based at least on the indicator indicating COMU, a class indicator indicating to classify an application traffic received from the first UPF node in accordance with the class identifier.

According to a third aspect, the object is achieved by a method performed by a first UPF node for enabling user plane traffic classification in a communications system supporting CUPS with multiple UPF nodes. The first UPF node receives, from a SMF node, a first detection rule to classify application traffic, first instructions rules to be applied to the classified application traffic and a class identifier to identify the classified application traffic towards a next UPF node. The first UPF node detects the application traffic with the first detection rule. The first UPF node classifies the application traffic in accordance with the first detection rule, and applies the first instruction rules to the classified application traffic.

The first UPF node forwards the application traffic toward the next UPF node along with the class identifier identifying a classification result.

According to a fourth aspect, the object is achieved by a method performed by a next UPF node for enabling user plane traffic classification in a communications system supporting CUPS with multiple UPF nodes. The next UPF node receives, from a SMF node, next detection rules to classify application traffic, next instructions rules for each next detection rule and to be applied to the classified application traffic, and a class indicator indicating to classify application traffic received from a first UPF node in accordance with a class identifier identifying a classification result. The next UPF node receives the application traffic from the first UPF node along with the class identifier identifying the classification result. Based on the class indicator, the next UPF node determines a second detection rule amongst the next detection rules. The second detection rule matches the classification result identified in the class identifier. The next UPF node classifies the received application traffic in accordance with the second detection rule and applies instruction rules for the second detection rule to the received application traffic.

According to a fifth aspect, the object is achieved by a PCF node for enabling user plane traffic classification in a communications system supporting CUPS with multiple UPF nodes. The PCF node is adapted to receive, from a SMF node, a policy request for a UE. The PCF node is adapted to obtain, from a UDR, an indicator indicating COMU for the UE. The PCF node is adapted to transmit, to the SMF node, a policy response comprising the indicator indicating COMU.

According to a sixth aspect, the object is achieved by a SMF node for enabling user plane traffic classification in a communications system supporting CUPS with multiple UPF nodes. The SMF node is adapted to transmit, to a PCF node, a policy request for a UE. The SMF node is adapted to receive, from the PCF node, a policy response comprising an indicator indicating COMU for the UE. The PCF node is adapted to transmit, to a first UPF node, a first detection rule to classify application traffic, first instructions rules to be applied to the classified application traffic and, based at least on the indicator indicating COMU, a class identifier to identify the classified application traffic towards a next UPF node. The SMF node is adapted to transmit, to a next UPF node, next detection rules to classify application traffic, next instructions rules for each next detection rule and to be applied to the classified application traffic and, based at least on the indicator indicating COMU, a class indicator indicating to classify an application traffic received from the first UPF node in accordance with the class identifier.

According to a seventh aspect, the object is achieved by a first UPF node for enabling user plane traffic classification in a communications system supporting CUPS with multiple UPF nodes. The UPF node is adapted to receive, from a SMF node, a first detection rule to classify application traffic, first instructions rules to be applied to the classified application traffic and a class identifier to identify the classified application traffic towards a next UPF node. The first UPF node is adapted to detect the application traffic with the first detection rule, and to classify the application traffic in accordance with the first detection rule. The first UPF node is adapted to apply the first instruction rules to the classified application traffic, and to forward the application traffic toward the next UPF node along with the class identifier identifying a classification result.

According to an eight aspect, the object is achieved by a next UPF node for enabling user plane traffic classification in a communications system supporting CUPS with multiple UPF nodes. The next UPF node is adapted to receive, from a SMF node, next detection rules to classify application traffic, next instructions rules for each next detection rule and to be applied to the classified application traffic, and a class indicator indicating to classify an application traffic received from a first UPF node in accordance with a class identifier identifying a classification result. The next UPF node is adapted to receive the application traffic from the first UPF node along with the class identifier identifying the classification result. The next UPF node is adapted to, based on the class indicator, determine a second detection rule amongst the next detection rules, wherein the second detection rule matches the classification result identified in the class identifier. The next UPF node is adapted to classify the received application traffic in accordance with the second detection rule and applying instruction rules for the second detection rule to the received application traffic.

Thanks to the indicator indicating COMU, the class identifier and the class indicator, the next UPF node leverages the classification done by the first UPF node, which improves the user plane traffic classification in a communications system.

The present disclosure affords many advantages, of which a non-exhaustive list of examples follows:

An advantage is that they allow a network operator to support COMU in 5G networks supporting CUPS, so that the next UPF node can leverage the classification done in a first UPF node, resulting in less processing and improved latency.

The present disclosure is not limited to the features and advantages mentioned above. A person skilled in the art will recognize additional features and advantages upon reading the following detailed description.

BRIEF DESCRIPTION OF THE DRAWINGS

The present disclosure will now be further described in more detail by way of example only in the following detailed description by reference to the appended drawings in which:

FIG. 5 is a flow chart illustrating a method performed by a PCF node.

FIG. 6 is a flow chart illustrating a method performed by a SMF node.

FIG. 7 is a flow chart illustrating a method performed by a first UPF node.

FIG. 8 is a flow chart illustrating a method performed by a next UPF node.

FIG. 100a-100b are schematic drawings illustrating a PCF node.

FIG. 200a-200b are schematic drawings illustrating a SMF node.

FIG. 300a-300b are schematic drawings illustrating a first UPF node.

The drawings are not necessarily to scale and the dimensions of certain features may have been exaggerated for the sake of clarity. Emphasis is instead placed upon illustrating a principle.

DETAILED DESCRIPTION

Figure 1:
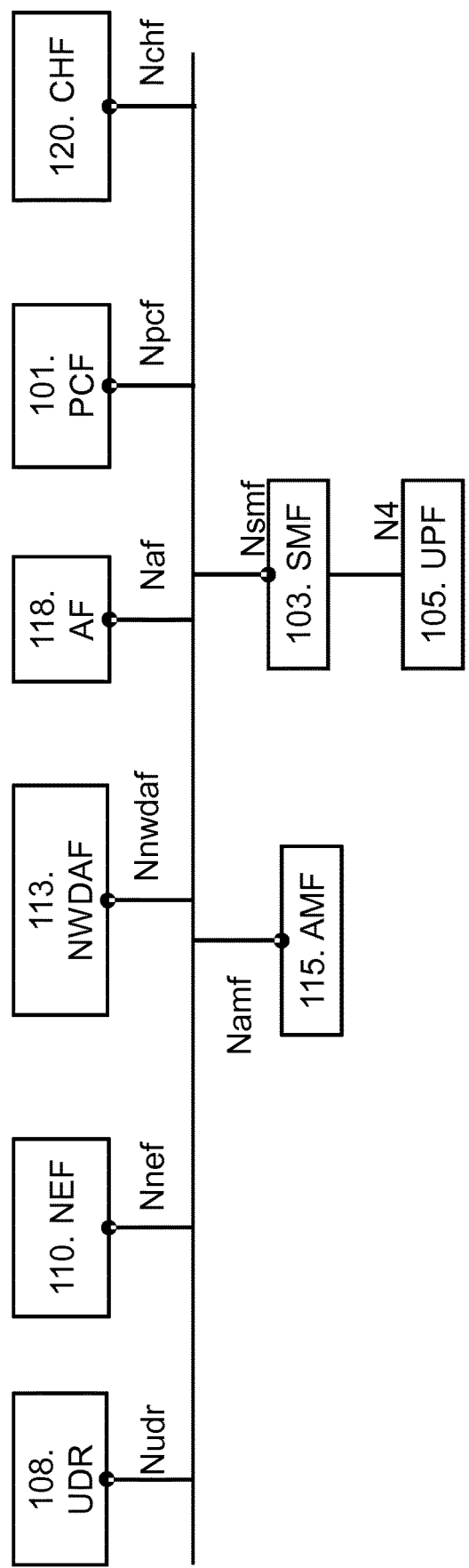
FIG. 1 is a block diagram illustrating a 3GPP 5GC network architecture.
Figure 2:
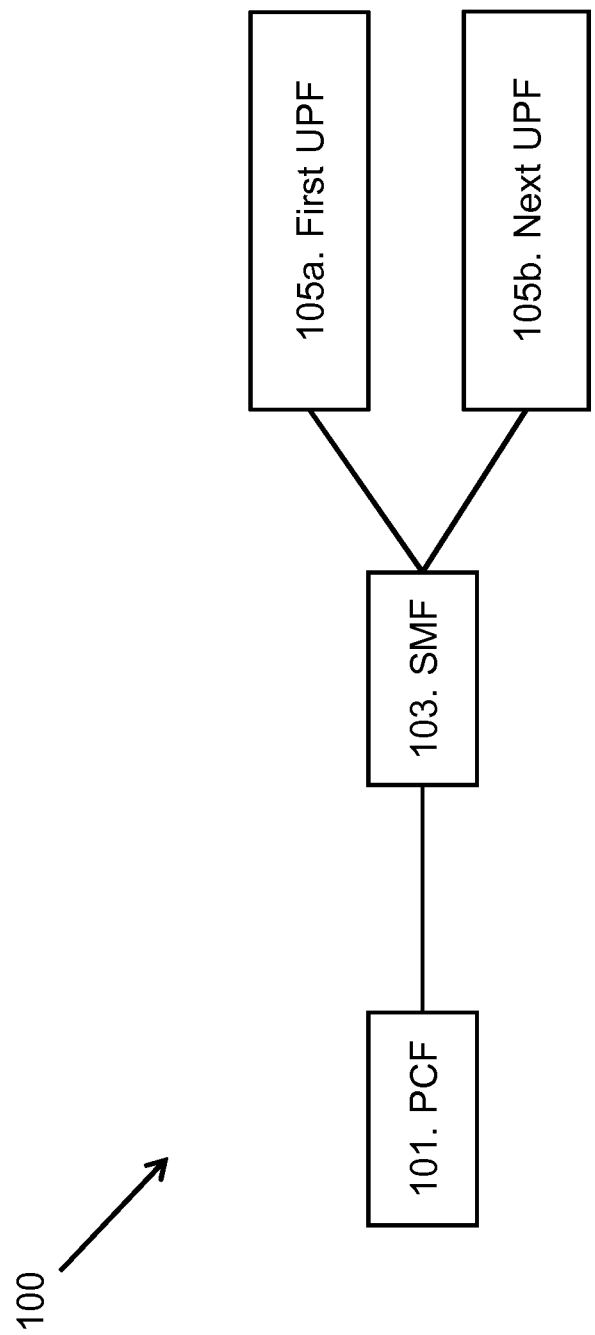
FIG. 2 is a block diagram illustrating a communications system.

FIG. 2 depicts a communications system 100. The communications system 100 may apply to one or more radio access technologies such as for example 2G, 3G, 4G, 5G or any other previous, current or future Third Generation Partnership Project (3GPP) radio access technology, or other radio access technologies such as e.g. Wireless Local Area Network (WLAN). The communications system 100 may be referred to as a communication network, a network, a system, a wireless communications system, a wireless communication network etc.

The communications system 100 comprises a PCF 101 and a SMF 103 adapted to communicate with each other. The SMF 103 is adapted to be connected to multiple UPFs 105. FIG. 2 shows two UPFs 105, i.e. a first UPF node 105*a* and a next UPF node 105*b*, but the communications system 100 may comprise any n number of UPF 105, where n is a positive integer. The reference number 105 is used herein when referring to any of the UPF nodes 105 comprised in the communications system 100. The next UPF node 105*b* may be a second UPF node, a third UPF node, or any other m UPF node, where m is a positive integer larger than one.

As mentioned earlier, the PCF 101 supports different functionality, e.g. unified policy framework to govern network behavior, provides policy rules to Control Plane function(s) to enforce them, and accesses subscription information relevant for policy decisions in the UDR 108. The SMF 103 supports different functionality, e.g. Session Establishment, modify and release, and policy related functionalities like termination of interfaces towards Policy control functions, Charging data collection, support of charging interfaces and control and coordination of charging data collection at an UPF 105. The UPF 105 supports handling of user plane traffic, including packet inspection, e.g. analysis and Classification, packet routing and forwarding, including traffic steering, traffic usage reporting and Quality of Service (QoS) handling. The PCF 101, the SMF 103 and the UPFs 105 may be seen as being comprised in a core network in the communications system 100, e.g. they may be CN nodes.

The communication system 100 may comprise a UE (not shown in FIG. 2) The UE may be served by a network node (not shown in FIG. 2), and is in this case capable of communicating with the network node over a communications link. The UE may be adapted to communicate with the core network, e.g. via a core network node and/or via a network node.

The UE may be a device by which a subscriber may access services offered by an operator's network and services outside operator's network to which the operator's radio access network and core network provide access, e.g. access to the Internet. The UE may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device, terminal device, communication device or any type of consumer electronic, for instance but not limited to television, radio, lighting arrangements, tablet computer, laptop or Personal Computer (PC). The UE may be portable, pocket storable, hand held, computer comprised, or vehicle mounted devices, enabled to communicate voice and/or data, via the radio access network, with another entity, such as another UE or a server.

It should be noted that the communication links in the communications system 100 may be of any suitable kind including either a wired or wireless link. The link may use any suitable protocol depending on type and level of layer, e.g. as indicated by the Open Systems Interconnection (OSI) model, as understood by the person skilled in the art.

The user plane traffic classification in a scenario of multiple UPFs 105 in the context of a communications system 100 such as e.g. a 5G network supporting CUPS is optimized. To achieve this, the 3GPP PFCP protocol may be extended. The following PFCP protocol extensions may be applicable:

- A COMU capability, e.g. in the PFCP Association procedure.
- A class identifier, e.g. a Class-ID Enrichment IE in the Forwarding Parameters IE in FAR at PFCP Session Establishment/Modification Request, for the SMF node 103 to indicate to the first UPF node 105*a* to convey a class indicator, e.g. Class-ID, to the next UPF node 105*b*.
- A class indicator, e.g. a PDI type, Class-ID, in the Create PDR IE within a PFCP Session Establishment/Modification Request, for the SMF node 103 to indicate to the first UPF 105*a* to match incoming application traffic based on the class indicator, e.g. Class-ID.

Figure 3:
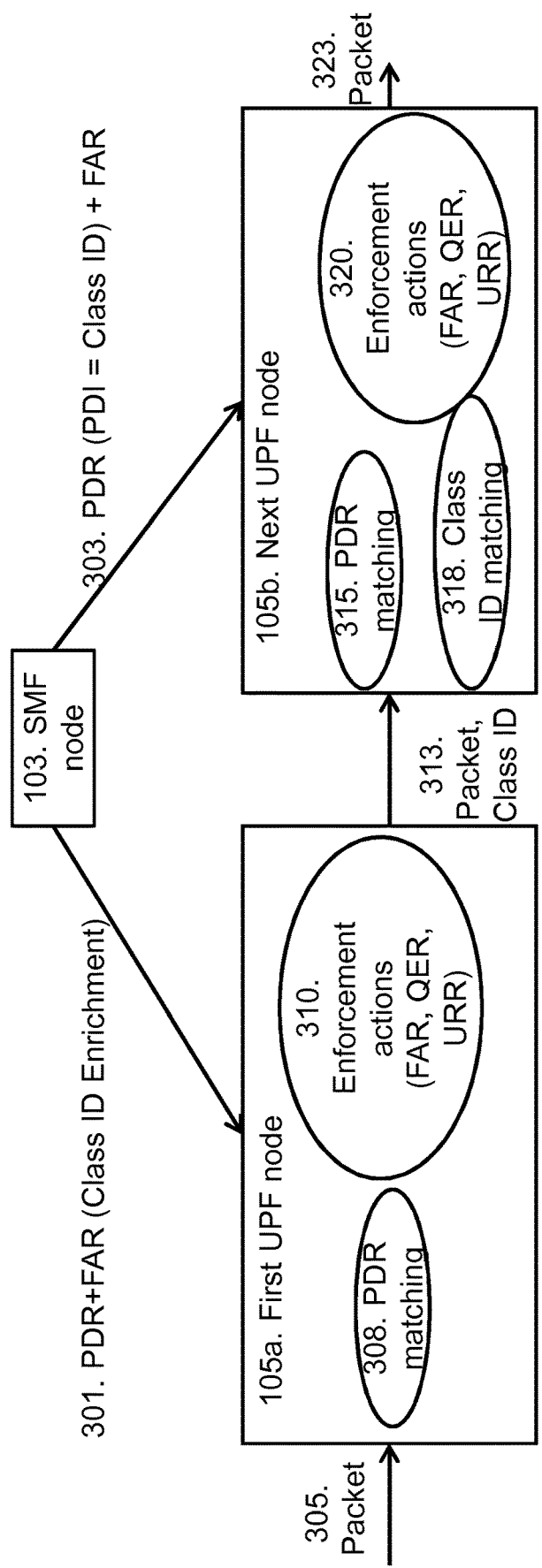
FIG. 3 is a block diagram illustrating a communications system and a method.

FIG. 3 illustrates a method which optimizes classification in a scenario with multiple UPF nodes 105. A SMF node 103 is shown in FIG. 3 which is adapted to communicate with the first UPF node 105*a* and the next UPF node 105*b*.

In step 301, the SMF node 103 provides a first detection rule and a class identifier to the first UPF node 105*a*. The first detection rule may be in the form of a first PDR. The class identifier may be referred to as Class ID Enrichment or Class ID Enrichment ID. The class identifier may be comprised in first instruction rule, e.g. a Forwarding Action Rule (FAR). A FAR may comprise the class ID. The first instruction rule may be referred to as a first enforcement action or first enforcement rule.

In step 303, the SMF node 103 provides a next detection rule to the next UPF node 105*b*. The next detection rule may be in the form of a next PDR. The next detection rule may comprise a class indicator, and the class indicator may be referred to as class ID. The class indicator may be a PDI. The class indicator may be a separate indicator, i.e. not comprised in the next detection rule. In step 303, the SMF node 103 provides a next instructions rule, e.g. in the form of next FAR. The next instructions rule may be referred to as a next enforcement rule.

In step 305, the first UPF node 105*a* receives a packet, and the packet 301 may be data traffic, application traffic or comprised in application traffic, or it may be user plane traffic.

The first UPF node 105*a* performs PDR matching in step 308, i.e. it matches the packet from step 305 with the PDR from step 301. Matching may also be referred to as classification.

In step 310, the first UPF node 105*a* performs or executes a first instruction rule. The first instruction rule may be an enforcement action or enforcement rule. The first instruction rule may be e.g. one or more of the FAR from step 301, QoS Enforcement Rule (QER), Usage Reporting Rule (URR) etc.

In step 313, the first UPF node 105*a* forwards the packet to the next UPF node 105*b* together with the class identifier from step 301.

The next UPF node 105*b* performs PDR matching in step 315 and class ID matching in step 318. The next UPF node 105*b* performs or executes a next instruction rule in step 320. The next instruction rule may be a next enforcement action or next enforcement rule. The next instruction rule may be one or more of the FAR from step 303, QER, URR etc.

In step 323, the next UPF node 105b forwards the packet in accordance with the next instruction rule, e.g. instructions in the FAR. The forwarded packet may be the same as the packet in step 305.

Summarized, FIG. 3 shows that the next UPF node 105b leverages the classification (e.g. PDR matching) done by the first UPF node 105a, by means of running a lighter class ID matching instead of the regular PDR matching. The class ID matching is lighter in terms of processing. The class ID matching may comprise to look for a string in the packet, i.e. the Class ID value and match it against the Class ID values in the configuration. Regular PDR matching usually requires complex processing, e.g. L3/L4/L7 analysis and classification or even calculating complex metrics like packet arrival times.

Figure 4A:
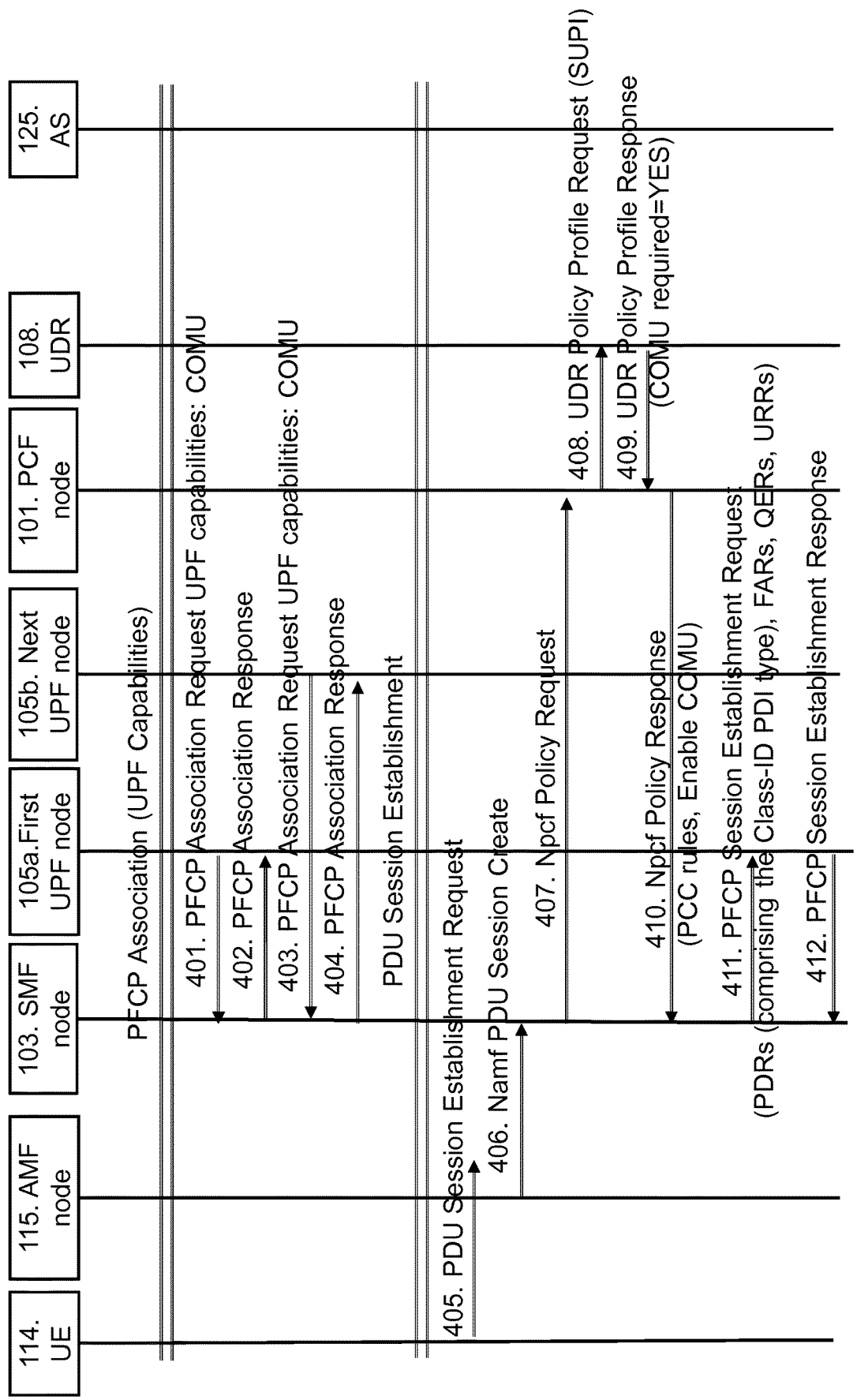
FIG. 4a is a signaling diagram illustrating a method.
Figure 4B:
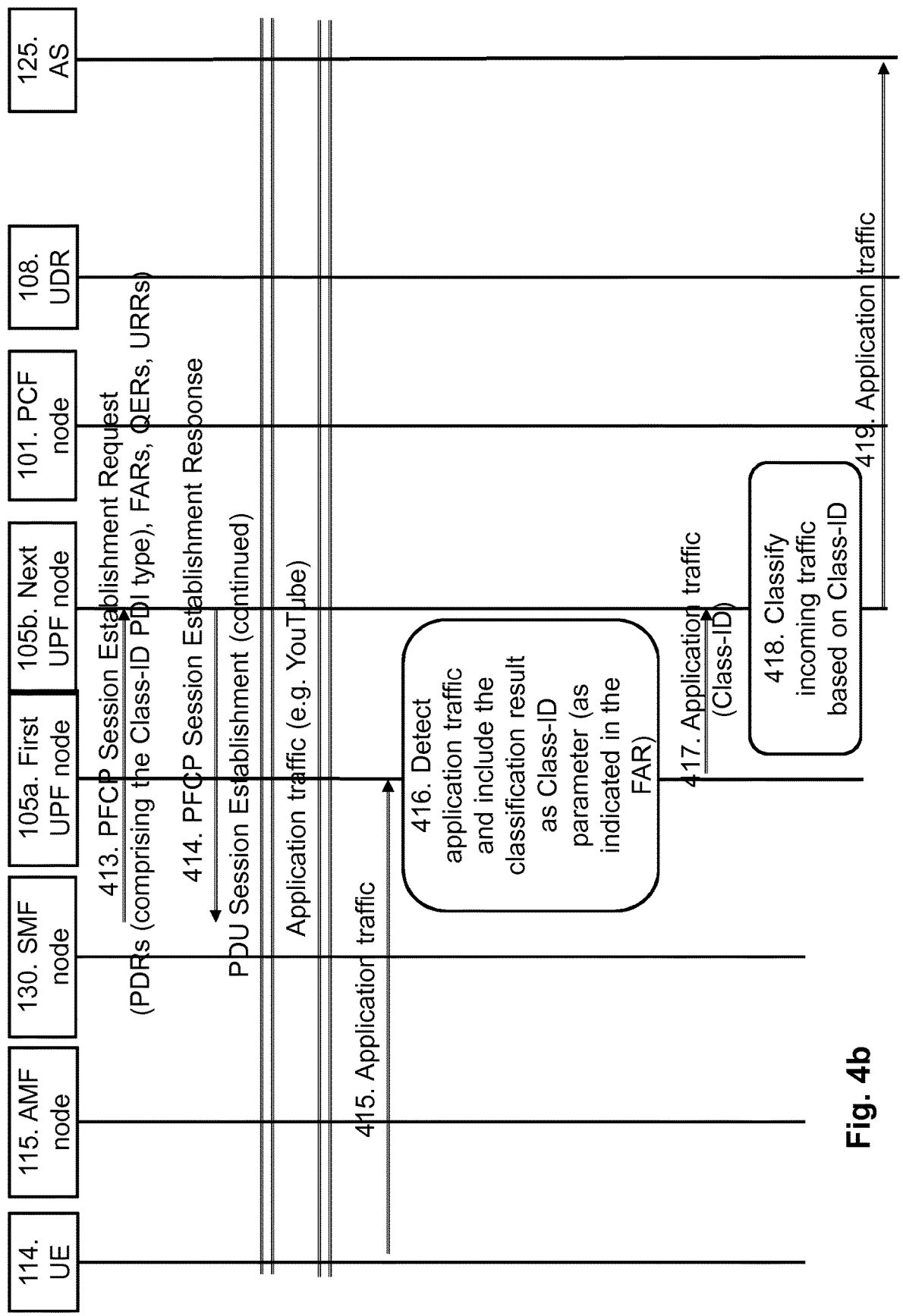
FIG. 4b is a signaling diagram illustrating a method.

FIG. 4a and FIG. 4b are signalling diagrams illustrating a method. FIG. 4a comprises steps 401-412 and FIG. 4b comprises steps 413-419. FIG. 4b may be described as a continuation of FIG. 4a. In addition to the PCF node 101, the SMF node 103, the first UPF node 105a and the next UPF node 105b, FIGS. 4a and 4b shows the UDR 108, the UE 114, the AMF node 115 and the AS 125. The signalling diagrams in FIGS. 4a and 4b illustrate a PDU session with two UPFs 105. The method in FIGS. 4a and 4b comprises at least one of the following steps, which steps may be performed in any suitable order than described below:

Steps 401-404 described below may be seen as being comprised in a Packet Flow Control Protocol (PFCP) association procedure. The PFCP association procedure is associated with UPF capabilities.

Step 401

This step is seen in FIG. 4a. The first UPF node 105a transmits a PFCP association request message to the SMF node 103. The PCFP association request message is a request notifying of UPF capabilities. The PFCP association request comprises a COMU capability of the first UPF node 105a. The COMU capability indicates that the first UPF node 105a has a COMU capability, e.g. that it supports COMU. The SMF node 103 receives the PFCP association request from the first UPF node 105a.

Step 402

This step is seen in FIG. 4a. The SMF node 103 transmits a PFCP association response message to the first UPF node 105a. The first UPF node 105a receives the PFCP association response message from the SMF node 103. The PFCP association response message is a response to the PFCP association request message in step 401. With this, the SMF node 103 knows that the first UPF node 105a has a COMU capability.

Step 403

This step is seen in FIG. 4a. The next UPF node 105b transmits a PFCP association request message to the SMF node 103. The PCFP association request message is a request notifying of UPF capabilities. The PFCP association request comprises a COMU capability. The COMU capability indicates that the next UPF node 105b has a COMU capability, e.g. that it supports COMU. The SMF node 103 receives the PFCP association request from the next UPF node 105b. With this, the SMF node 103 knows that the next UPF node 105b has a COMU capability.

Step 404

This step is seen in FIG. 4a. The SMF node 103 transmits a PFCP association response message to the next UPF node 105b. The next UPF node 105b receives the PFCP association response message from the SMF node 103. The PFCP association response message is a response to the PFCP association request message in step 403.

In steps 401-404 described above, at the PCFP association procedure between the UPF nodes 105 and the SMF node 103, the first UPF node 105a and the next UPF node 105b will report their support for COMU or capability of COMU. Based on this, the SMF node 103 will select a UPF 105 having a COMU capability. Additionally, the COMU functionality shall be activated or enabled in the UPF 105 having the COMU functionality. If the COMU functionality is not activated, the UPF 105 may not perform any action in relation with this functionality. UPF capabilities of UPF nodes 105 may be reported using a COMU capability parameter or Information Element (IE). This may allow the SMF node 103 to know which UPFs 105 support this capability and thus can influence the SMF node's selection of UPF node 105. Alternatively, this COMU capability may be split into two different capabilities, e.g. a class identifier and a class indicator. Table 1 below shows UP function features where the COMU capability is seen in the last row.

TABLE 1

UP Function Features

| Feature Octet/Bit | Feature | Interface | Description |
| --- | --- | --- | --- |
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.x). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | N4 | The UPF supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | COMU | Sxb, Sxc | Classification Optimization for Multiple UPFs capability is supported by the UP function. |

Steps 405-414 which will now be described may be seen as being comprised in a PDU session establishment procedure.

Step 405

This step is seen in FIG. 4a. The UE 114 transmits a PDU session establishment request message to the AMF node 115. The AMF node 115 receives the PDU session establishment request message from the UE 114.

Step 406

This step is seen in FIG. 4a. The AMF node 115 transmits a Namf PDU session create message to the SMF node 103. The SMF node 103 receives the Namf PDU session create message from the AMF node 115.

Step 407

This step is seen in FIG. 4a. The SMF node 103 transmits an Npcf policy request message to the PCF node 101. The PCF node 101 receives the Npcf policy request message from the SMF node 103.

Step 408

This step is seen in FIG. 4a. The PCF node 101 transmits a UDR policy profile request message to the UDR 108. The UDR policy profile request message comprises a Subscription Permanent Identifier (SUPI).

In steps 405-409 described above, the UE 114 triggers a PDU session establishment procedure. As part of this procedure, at step 409, the PCF node 101 retrieves the subscriber profile from the UDR 108, which in this case indicates that the COMU functionality is required for this subscriber, indicated with COMU required=YES in FIG. 4a. The subscriber profile is a profile for the subscriber associated with the UE 114.

Step 409

This step is seen in FIG. 4a. The UDR 108 transmits a UDR policy profile response message to the PCF node 101. The PCF node 101 receives the UDR policy profile response message from the UDR 108. The UDR policy profile response message comprises information indicating that COMU is required.

Step 410

This step is seen in FIG. 4a. The PCF node 101 transmits the Npcf policy response message to the SMF node 103. The Npcf policy response message may comprise at least one of PCC rules, an indicator indicating COMU etc. The SMF node 103 receives the Npcf policy response message from the PCF node 101.

In this step, the PCF node 101 installs, in the SMF node 103, the policy rules, e.g. PCC rules, for the different applications, e.g. YouTube, Netflix, Facebook, etc. On a per PDU session basis, an indicator indicating COMU is transmitted to the SMF node 103. The indicator indicating COMU may be described as a parameter indicating if COMU is to be enabled in the SMF node 103. Note that the SMF node 103 may act as an intermediate network function (NF). The COMU is actually enabled in the UPF 105 by the SMF node 103 in step 411 described below.

Step 411

This step is seen in FIG. 4a. The SMF node 103 transmits a PFCP session establishment request message to the first UPF node 105a. The first UPF node 105a receives the PFCP session establishment request message from the SMF node 103. The PFCP session establishment request message may comprise one or more of: PDRs, FARs, QERs, URRs etc. The PDR may comprise a class identifier. The class identifier may be a class ID PDI type. This step may be described as the SMF node 103 enabling the COMU functionality in the first UPF node 105a.

Step 412

This step is seen in FIG. 4a. The first UPF node 105a transmits a PFCP session establishment response message to the SMF node 103. The SMF node 103 receives the PFCP session establishment message from the first UPF node 105a.

Steps 411-412 described above, the SMF node 101 triggers the PFCP Session Establishment procedure towards the first UPF node 105a to indicate the PDRs and the corresponding enforcement actions, e.g. FARs, QERs, URRs, etc. for the PDU session. As the COMU functionality is enabled, the SMF node 103 will indicate to the first UPF node 105a to carry the results of the classification, e.g. matched PDR as class indicator towards the next UPF node 105b, by means of extending a PFCP protocol with a class identifier. The class identifier may be referred to as a class ID enrichment IE and may be comprised in a Forwarding Parameters IE in FAR at PFCP Session Establishment Request, as shown in the last row in Table 2:

TABLE 2

Forwarding Parameters IE in FAR
Octet 1 and 2 Forwarding Parameters IE Type = 4 (decimal)
Octets 3 and 4 Length = n

| Information elements | P | Condition/Comment | Appl. | | | | IE Type |
| --- | --- | --- | --- | --- | --- | --- | --- |
| | | | Sxa | Sxb | SxC | N4 | |
| Destination Interface | M | This IE shall identify the destination interface of the outgoing packet. | X | X | X | X | Destination Interface |
| Network Instance | O | When present, this IE shall identify the Network instance towards which to send the outgoing packet. See NOTE 1. | X | X | X | X | Network Instance |
| Redirect Information | C | This IE shall be present if the UP function is required to enforce traffic redirection towards a redirect destination provided by the CP function. | — | X | X | X | Redirect Information |
| Outer Header Creation | C | This IE shall be present if the UP function is required to add one or more outer header(s) to the outgoing packet. If present, it shall contain the F-TEID of the remote GTP-U peer when adding a GTP-U/UDP/IP header, or the Destination IP address and/or Port Number when adding a UDP/IP header or an IP header or the C-TAG/S-TAG (for 5GC). See NOTE 2. | X | X | — | X | Outer Header Creation |
| Transport Level Marking | C | This IE shall be present if the UP function is required to mark the IP header with the DSCP marking as defined by IETF RFC 2474 [22]. When present for | X | X | — | X | Transport Level Marking |

TABLE 2-continued

Forwarding Parameters IE in FAR
Octet 1 and 2 Forwarding Parameters IE Type = 4 (decimal)
Octets 3 and 4 Length = n

| Information elements | P | Condition/Comment | Appl. Sxa | Sxb | SxC | N4 | IE Type |
|---|---|---|---|---|---|---|---|
| | | EPC, it shall contain the value of the DSCP in the TOS/Traffic Class field set based on the QCI, and optionally the ARP priority level, of the associated EPS bearer, as described in clause 5.10 of 3GPP TS 23.214 [2]. When present for 5GC, it shall contain the value of the DSCP in the TOS/Traffic Class field set based on the 5QI, the Priority Level (if explicitly signalled), and optionally the ARP priority level, of the associated QoS flow, as described in clause 5.8.2.7 of 3GPP TS 23.501 [28], | | | | | |
| Forwarding Policy | C | This IE shall be present if a specific forwarding policy is required to be applied to the packets. It shall be present if the Destination Interface IE is set to SGi-LAN/N6-LAN. It may be present if the Destination Interface is set to Core, Access, or CP-Function. See NOTE 2. When present, it shall contain an Identifier of the Forwarding Policy locally configured in the UP function. | — | X | X | X | Forwarding Policy |
| Header Enrichment | O | This IE may be present if the UP function indicated support of Header Enrichment of UL traffic. When present, it shall contain information for header enrichment. | — | X | X | X | Header Enrichment |
| Linked Traffic Endpoint ID | C | This IE may be present, if it is available and the UP function indicated support of the PDI optimisation feature, (see clause 8.2.25). When present, it shall identify the Traffic Endpoint ID allocated for this PFCP session to receive the traffic in the reverse direction (see clause 5.2.3.1). | X | X | — | X | Traffic Endpoint ID |
| Proxying | C | This IE shall be present if proxying is to be performed by the UP function. When present, this IE shall contain the information that the UPF shall respond to Address Resolution Protocol and/or IPv6 Neighbour Solicitation based on the local cache information for the Ethernet PDUs. | — | — | — | X | Proxying |
| Destination Interface Type | O | This IE may be present to indicate the 3GPP interface type of the destination interface, if required by functionalities in the UP Function, e.g. for performance measurements. | X | X | — | X | 3GPP Interface Type |
| Class-ID Enrichment | O | This IE may be present if the UP function indicated support of Optimized Classification in Multiple UPF scenarios. When present, it shall comprise information for Class-ID enrichment. | — | X | X | X | Class-ID Enrichment |

Step 413

This step is seen in FIG. 4b. The SMF node 103 transmits a PFCP session establishment request message to the next UPF node 105b. The next UPF node 105b receives the PFCP session establishment request message from the SMF node 103. The PFCP session establishment request message comprises one or more of: PDRs, FARs, QERs, URRs etc. The PDR may comprise the class identifier. The class identifier may be a class ID PDI type.

Step 414

This step is seen in FIG. 4b. The next UPF node 105b transmits a PFCP session establishment response message to the SMF node 103. The SMF node 103 receives the PFCP session establishment response message from the next UPF node 105b.

In steps 413-414, the SMF node 103 triggers a PFCP session establishment procedure towards the next UPF node 105b to indicate the PDRs and the corresponding enforcement actions for the PDU session. The corresponding enforcement actions may be e.g. FARs, QERs, URRs, etc. As the COMU functionality is enabled in the SMF node 103, the SMF node 103 will indicate the next UPF 105b to classify application traffic based on the class identifier, e.g. in the GTP-U header, by means of a class indicator. The application traffic may be referred to as user plane traffic. The PFCP protocol may comprise the class indicator. The class indicator, e.g. Class ID, may be a PDI type in the create PDR IE within PFCP Session Establishment Request, as shown in the last row in Table 3 below:

TABLE 3

PDI IE within PFCP Session Establishment Request
Octet 1 and 2 PDI IE Type = 2 (decimal)
Octets 3 and 4 Length = n

| Information elements | P | Condition/Comment | Appl. Sxa | Sxb | Sxc | N4 | IE Type |
|---|---|---|---|---|---|---|---|
| Source Interface | M | This IE shall identify the source interface of the incoming packet. | X | X | X | X | Source Interface |
| Local F-TEID | O | This IE shall not be present if Traffic Endpoint ID is present. If present, this IE shall identify the local F-TEID to match for an incoming packet. The CP function shall set the CHOOSE (CH) bit to 1 if the UP function supports the allocation of F-TEID and the CP function requests the UP function to assign a local F-TEID to the PDR. | X | X | — | X | F-TEID |
| Network Instance | O | This IE shall not be present if Traffic Endpoint ID is present. It shall be present if the CP function requests the UP function to allocate a UE IP address/prefix and the Traffic Endpoint ID is not present. If present, this IE shall identify the Network instance to match for the incoming packet. See NOTE 1, NOTE2. | X | X | X | X | Network Instance |
| UE IP address | O | This IE shall not be present if Traffic Endpoint ID is present. If present, this IE shall identify the source or destination IP address to match for the incoming packet. (NOTE 5) The CP function shall set the CHOOSE (CH) bit to 1 if the UP function supports the allocation of UE IP address/ prefix and the CP function requests the UP function to assign a UE IP address/prefix to the PDR. | — | X | X | X | UE IP address |
| Traffic Endpoint ID | C | This IE may be present if the UP function has indicated the support of PDI optimization. If present, this IE shall uniquely identify the Traffic Endpoint for that PFCP session. | X | X | X | X | Traffic Endpoint ID |
| SDF Filter | O | If present, this IE shall identify the SDF filter to match for the incoming packet. Several IEs with the same IE type may be present to provision a list of SDF Filters. The full set of applicable SDF filters, if any, shall be provided during the creation or the modification of the PDI. See NOTE 3. | — | X | X | X | SDF Filter |
| Application ID | O | If present, this IE shall identify the Application ID to match for the incoming packet. | — | X | X | X | Application ID |
| Ethernet PDU Session Information | O | This IE may be present to identify all the (DL) Ethernet packets matching an Ethernet PDU session (see clause 5.13.1). | — | — | — | X | Ethernet PDU Session Information |
| Ethernet Packet Filter | O | If present, this IE shall identify the Ethernet PDU to match for the incoming packet. Several IEs with the same IE type may be present to represent a list of Ethernet Packet Filters. The full set of applicable Ethernet Packet filters, if any, shall be provided during the creation or the modification of the PDI. | — | — | — | X | Ethernet Packet Filter |
| QFI | O | If present, this IE shall identify the QoS Flow Identifier to match for the incoming packet. Several IEs with the same IE type may be present to provision a list of QFIs. When present, the full set of applicable QFIs shall be provided during the creation or the modification of the PDI. | — | — | — | X | QFI |
| Framed-Route | O | This IE may be present for a DL PDR if the UPF indicated support of Framed Routing (see clause 8.2.25). If present, this IE shall describe a framed route. Several IEs with the same IE type may be present to provision a list of framed routes. (NOTE 5) | — | X | — | X | Framed-Route |

TABLE 3-continued

PDI IE within PFCP Session Establishment Request
Octet 1 and 2 PDI IE Type = 2 (decimal)
Octets 3 and 4 Length = n

| Information elements | P | Condition/Comment | Sxa | Sxb | Sxc | N4 | IE Type |
|---|---|---|---|---|---|---|---|
| Framed-Routing | O | This IE may be present for a DL PDR if the UPF indicated support of Framed Routing (see clause 8.2.25). If present, this IE shall describe a framed route. | — | X | — | X | Framed-Routing |
| Framed-IPv6-Route | O | This IE may be present for a DL PDR if the UPF indicated support of Framed Routing (see clause 8.2.25). If present, this IE shall describe a framed IPv6 route. Several IEs with the same IE type may be present to provision a list of framed IPv6 routes. (NOTE 5) | — | X | — | X | Framed-IPv6-Route |
| Source Interface Type | O | This IE may be present to indicate the 3GPP interface type of the source interface, if required by functionalities in the UP Function, e.g. for performance measurements. | X | X | — | X | 3GPP Interface Type |
| Class-ID | O | If present, this IE shall identify the Class-ID to match for the incoming packet. | — | X | X | X | Class-ID |

Alternatively, instead of creating a PDI type, e.g. Class-ID, in the PDR, it is also possible to define the Class-ID outside the PDR, as part of a new class detection rule, as opposed to the PDR.

After step 414, the PDU session establishment continues.

Steps 415-419 describe application traffic. The application traffic may be described as data traffic, traffic, packets, user plane traffic. The application traffic may be e.g. YouTube data.

Step 415

This step is seen in FIG. 4b. The UE 114 transmits application traffic to the first UPF node 105a. The first UPF node 105a receives application traffic from the UE 114.

Step 416

This step is seen in FIG. 4b. The first UPF node 105a detects the application traffic, performs classification and includes the classification result as a class identifier. The class identifier may be indicated in the FAR.

Step 417

This step is seen in FIG. 4b. The first UPF node 105a forwards the application traffic to the next UPF 105b, together with the class identifier. The next UPF 105b receives the application traffic together with the class identifier from the first UPF node 105a.

In steps 415 to 417, the UE 114 starts application traffic, e.g. YouTube. The first UPF node 105a will detect this application traffic, that will match the corresponding PDR, e.g. PDR with appld=YouTube. After the PDR matching, the corresponding enforcement actions, e.g. QER, URR, FAR, etc., will be performed. The PDR matching may also be referred to as classification. As the COMU functionality is enabled at the first UPF node 105a for this PDU session, the following extra step is performed by the first UPF node 105a:

The first UPF node 105a will include the classification result, e.g. the matched PDR or the corresponding application Id (appld), in the class indicator parameter, as indicated by the SMF node 103 in the class identifier IE at step 411 above. The GTP-U header in N9 interface between UPFs may be extended to convey the class indicator parameter value, so the IP packet encapsulated within the GTP-U header may be carried towards the next UPF nod 105b.

Step 418

This step is seen in FIG. 4b. The next UPF node 105b classifies the incoming application traffic based on the class identifier, e.g. the class ID. The application traffic may be user plane traffic.

Step 419

This step is seen in FIG. 4b. The next UPF 105b forwards the application traffic to the AS 125. The AS 125 receives the application traffic from the next UPF 125b.

In steps 418 and 419, the next UPF node 105b will receive the IP packet encapsulated in the GTP-U header. As the COMU functionality is enabled at the second UPF node 105b for this PDU session, the following extra actions will be performed by the second UPF node 105b:

The second UPF node 105b will run the PDR matching based on the class identifier, e.g. a class-ID PDI type, as indicated by the SMF node 103 at step 413 above. The next UPF node 105b will retrieve the class indicator, e.g. Class-ID retrieved from the GTP-U header, and will match it against the set of PDRs in this PFCP session, which will include the class identifier, e.g. the Class-ID PDI type). This matching procedure results in much less processing than a procedure with extraction of the IP packet and matching it against the existing PDRs of Application ID or Service Data Flow (SDF) filter types.

The method described above will now be described seen from the perspective of the PCF node 101. FIG. 5 is a flowchart describing the method performed by the PCF node 101 for enabling user plane traffic classification in a communications system 100 supporting CUPS with multiple UPF nodes 105. The method comprises at least one of the following steps to be performed by the PCF node 101, which steps may be performed in any suitable order than described below:

Step 501

This step corresponds to step 407 in FIG. 4a. The PCF node 101 receives, from a SMF node 103, a policy request for a UE 114.

Step 502

This step corresponds to steps 408 and 409 in FIG. 4a. The PCF node 101 obtains, from a UDR 108, an indicator indicating COMU for the UE 114.

A profile for the UE 114 may be obtained together with the indicator indicating COMU. The profile may comprise information associated with e.g. a subscriber associated with the UE 114.

Step 503

This step corresponds to step 410 in FIG. 4a. The PCF node 101 transmits, to the SMF node 103, a policy response comprising the indicator indicating COMU.

The method described above will now be described seen from the perspective of the SMF node 103. FIG. 6 is a flowchart describing the method performed by the SMF node 103 for enabling user plane traffic classification in a communications system 100 supporting CUPS with multiple UPF nodes 105. The method comprises at least one of the following steps to be performed by the SMF node 103, which steps may be performed in any suitable order than described below:

Step 601

This step corresponds to steps 401 and 403 in FIG. 4a. The SMF node 103 may receive a COMU capability from at least one of the first UPF node 105a and the next UPF node (105b. The COMU capability indicates that the UPF node 105, which sends it, is capable of or supports COMU.

The COMU capability may comprise at least one of the class identifier and the class indicator.

Step 602

The SMF node 103 may select the at least one of the first UPF node 105a and the next UPF node 105b based on the received COMU capability. The SMF node 103 may select the UPF node 105 from which the SMF node 103 has received a COMU capability. If the first UPF node 105a sends the COMU capability, then the SMF node 103 may select the first UPF node 105a. If the next UPF node 105b sends the COMU capability, then the SMF node 103 may select the next UPF node 105b. If both the first UPF node 105a and the next UPF node 105b send a COMU capability, then the SMF node selects both first UPF node 105a and next UPF node 105b, since they have previously reported that they have COMU capability.

Step 603

This step corresponds to step 407 in FIG. 4a. The SMF node 103 transmits, to a PCF node 101, a policy request for a UE 114.

Step 604

This step corresponds to step 410 in FIG. 4a. The SMF node 103 receives, from the PCF node 101, a policy response comprising an indicator indicating COMU for the UE 114. The indicator indicating COMU indicates that a COMU functionality in the SMF node 103 should be enabled. The indicator indicating COMU is the same as in step 409 in FIG. 4a. The policy response may further comprise control rules for applications.

Step 605

This step corresponds to step 411 in FIG. 4a. The SMF node 103 transmits the following to a first UPF node 105:
A first detection rule to classify application traffic,
First instructions rules to be applied to the classified application traffic, and
Based at least on the indicator indicating COMU, a class identifier to identify the classified application traffic towards a next UPF node 105b.

The class identifier, apart from being based on the indicator indicating COMU, may also be based on the COMU capability received in step 601.

The indicator indicating COMU is the same as in step 409 in FIG. 4a.

The indicator indicating COMU may be described as a UPF class identifier capability, and it is not associated with the UDR 108.

The class identifier may be referred to as a Class-ID Enrichment parameter or a Class-ID Enrichment IE.

The application traffic may be user plane traffic.

Step 606

This step corresponds to step 413 in FIG. 4b. The SMF node 103 transmits the following to a next UPF node 105b:
Next detection rules to classify application traffic.
Next instructions rules for each next detection rule and to be applied to the classified application traffic, and,
Based at least on the indicator indicating COMU, a class indicator indicating to classify the application traffic received from the first UPF node 105a in accordance with the class identifier.

The class indicator, apart from being based on the indicator indicating COMU, may also be based on the COMU capability received in step 601.

The indicator indicating COMU may be described as a UPF class identifier capability, and it is not associated with the UDR 108.

The class indicator may be referred to as a Class-ID. The class indicator may be a PDI IE comprised in a Create PDR IE, or the class indicator may be a part of a Class Detection Rule.

The class identifier may be referred to as a Class-ID Enrichment parameter or Class-ID Enrichment IE. The class identifier may be a Class-ID Enrichment Information IE comprised in a Forwarding Parameters IE in a FAR.

The application traffic may be user plane traffic.

The method described above will now be described seen from the perspective of the first UPF node 105a. FIG. 7 is a flowchart describing the method performed by the first UPF node 105a for enabling user plane traffic classification in a communications system 100 supporting CUPS with multiple UPF nodes 105. The method comprises at least one of the following steps to be performed by the first UPF node 105a, which steps may be performed in any suitable order than described below:

Step 700

This step corresponds to step 401 in FIG. 4a. The first UPF node 105a may transmit a COMU capability to the SMF node 103. The COMU capability indicates that the first UPF node 105 is capable of or supports COMU.

The COMU capability may comprise at least one of the class identifier and a class indicator.

Step 701

This step corresponds to step 411 in FIG. 4a. The first UPF node 105a receives, from a SMF node 103, a first detection rule to classify application traffic, first instructions rules to be applied to the classified application traffic and a class identifier to identify the classified application traffic towards a next UPF node 105b. The application traffic may be user plane traffic.

Step 702

This step corresponds to step 416 in FIG. 4b. The first UPF node 105a detects the application traffic with the first detection rule.

Step 703

This step corresponds to step 416 in FIG. 4b. The first UPF node 105a classifies the application traffic in accordance with the first detection rule. The classification results in a classification result. The classification result may be a PDR ID, e.g. the PDR ID of the matched PDR.

Step 704

This step corresponds to step 416 in FIG. 4b. The first UPF node 105a applies the first instruction rules to the classified application traffic.

Step 705

This step corresponds to step 417 in FIG. 4b. The first UPF node 105a forwards the application traffic toward the next UPF node 105b along with the class identifier identifying a classification result.

The application traffic along with the class identifier identifying a classification result may be comprised in an IP packet encapsulated in a GTP-U header.

The method described above will now be described seen from the perspective of the next UPF node 105b. FIG. 8 is a flowchart describing the method performed by the next UPF node 105b for enabling user plane traffic classification in a communications system 100 supporting CUPS with multiple UPF nodes 105. The method comprises at least one of the following steps to be performed by the next UPF node 105b, which steps may be performed in any suitable order than described below:

Step 800

This step corresponds to step 403 in FIG. 4a. The next UPF node 105b may transmit a COMU capability to the SMF node 103. The COMU capability may indicate that the next UPF node 105b is capable of or supports COMU. The COMU capability may be referred to as a COMU capability parameter or COMU capability information.

The COMU capability may comprise at least one of a class identifier and the class indicator.

Step 801

This step corresponds to step 413 in FIG. 4b. The next UPF node 105b receives the following from a SMF node 103:

Next detection rules to classify application traffic

Next instructions rules for each next detection rule and to be applied to the classified application traffic, and A class indicator indicating to classify application traffic received from a first UPF node 105a in accordance with a class identifier identifying a classification result.

The class indicator may be referred to as a Class-ID. The class indicator may be a PDI IE comprised in a Create PDR IE, or the class indicator may be a part of a Class Detection Rule.

The class identifier may be referred to as a Class-ID Enrichment parameter or Class-ID Enrichment IE. The class identifier may be a Class-ID Enrichment Information IE comprised in a Forwarding Parameters IE in a FAR.

The application traffic may be user plane traffic.

Step 802

This step corresponds to step 417 in FIG. 4b. The next UPF node 105b receives the application traffic from the first UPF node 105a along with the class identifier identifying the classification result.

Step 803

This step corresponds to step 418 in FIG. 4b. Based on the class indicator, the next UPF node 105b determines a second detection rule amongst the next detection rules. The second detection rule matches the classification result identified in the class identifier.

Step 804

This step corresponds to step 418 in FIG. 4b. The next UPF node 105b classifies the received application traffic in accordance with the second detection rule and applies instruction rules for the second detection rule to the received application traffic.

Step 805

This step corresponds to step 419 in FIG. 4b. The next UPF node 150b may forward the application traffic to an AS 125. The AS 125 may process the received application traffic.

To perform the method steps shown in FIGS. 3, 4a, 4b and 5 for enabling user plane traffic classification in a communications system 100 supporting CUPS with multiple UPF nodes 105, the PCF node 101 may comprise an arrangement as shown in FIG. 100a or FIG. 100b, or both.

The PCF node 101 for enabling user plane traffic classification in a communications system 100 supporting CUPS with multiple UPF nodes 105 is adapted to, e.g. by means of a receiving unit 1001, receive, from a SMF node 103, a policy request for a UE 114.

The PCF node 101 is adapted to, e.g. by means of an obtaining unit 1003, obtain, from a UDR 108, an indicator indicating COMU for the UE 114. A profile for the UE 114 may be obtained together with the indicator indicating COMU.

The PCF node 101 is adapted to, e.g. by means of a transmitting unit 1005, transmit, to the SMF node 103, a policy response comprising the indicator indicating COMU.

The present mechanism performed by the PCF node 101 may be implemented through one or more processors, such as a processor 1010 in the PCF node 101 depicted in FIG. 100a, together with computer program code for performing the functions and actions of. A processor, as used herein, may be understood to be a hardware component. The program code mentioned above may also be provided as a computer program product, for instance in the form of a data carrier carrying computer program code for performing the methods described herein when being loaded into the PCF node 101. One such carrier may be in the form of a CD ROM disc. It is however feasible with other data carriers such as a memory stick. The computer program code may furthermore be provided as pure program code on a server and downloaded to the PCF node 101.

The PCF node 101 may comprise a memory 1013 comprising one or more memory units. The memory 1013 is arranged to be used to store obtained information, store data, configurations, schedulings, and applications etc. to perform the methods herein when being executed in the PCF node 101.

The PCF node 101 may receive information from, e.g. the SMF node 103, the first UPF node 105a, the next UPF node 105b, through a receiving port 1015. The receiving port 1015 may be connected to one or more antennas in PCF node 101. The PCF node 101 may receive information from another structure in the communications system 100 through the receiving port 1015. Since the receiving port 1015 may be in communication with the processor 1010, the receiving port 1015 may then send the received information to the processor 1010. The receiving port 1015 may also be configured to receive other information.

The processor 1010 in the PCF node 101 may be further configured to transmit or send information to e.g. the SMF node 103, the first UPF node 105a, the next UPF node 105b, or another structure in the communications system 100, through a sending port 1018, which may be in communication with the processor 1010, and the memory 1013.

The PCF node 101 may comprise the receiving unit 1001, the obtaining unit 1003, the transmitting unit 1005, other units 1008 etc., as described above.

The receiving unit 1001, the obtaining unit 1003, the transmitting unit 1005, other units 1008 described above may refer to a combination of analog and digital circuits, and/or one or more processors configured with software and/or firmware, e.g., stored in memory, that, when executed by the one or more processors such as the processor 1010, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 1001-1008 described above may be implemented as one or more applications running on one or more processors such as the processor 1010.

The methods described herein for the PCF node 101 may be respectively implemented by means of a computer program 1020 product, comprising instructions, i.e., software code portions, which, when executed on at least one processor 010, cause the at least one processor 1010 to carry out the actions described herein, as performed by the PCF node 101. The computer program 1020 product may be stored on a computer-readable storage medium 1023. The computer-readable storage medium 1023, having stored thereon the computer program 1010, may comprise instructions which, when executed on at least one processor 1010, cause the at least one processor 1010 to carry out the actions described herein, as performed by the PCF node 101. The computer-readable storage medium 1023 may be a non-transitory computer-readable storage medium, such as a CD ROM disc, or a memory stick. The computer program 1020 product may be stored on a carrier comprising the computer program 1020 just described. The carrier is one of an electronic signal, optical signal, radio signal, or the first computer-readable storage medium 1023, as described above.

The PCF node 101 may comprise a communication interface configured to facilitate communications between the PCF node 101 and other nodes or devices, e.g., the SMF node 103, the first UPF node 105*a*, the next UPF node 105*b*, or another structure. The interface may comprise a transceiver configured to transmit and receive radio signals over an air interface in accordance with a suitable standard.

The PCF node 101 may comprise the arrangement depicted in FIG. 100*b*. The PCF node 101 may comprise a processing circuitry 1025, e.g., one or more processors such as the processor 1010, in the PCF node 101 and the memory 1013. The PCF node 101 may also comprise a radio circuitry 1028, which may comprise e.g., the receiving port 1015 and the sending port 1018. The processing circuitry 1025 may be configured to, or operable to, perform the method actions according to FIGS. 3, 4*a*, 4*b* and 5 in a similar manner as that described in relation to FIG. 100*a*. The radio circuitry 1028 may be configured to set up and maintain at least a wireless connection with the PCF node 101. Circuitry may be understood herein as a hardware component.

The PCF node 101 is operative to operate in the communications system 100. The PCF node 101 may comprise the processing circuitry 1025 and the memory 1013. The memory 1013 comprises instructions executable by the processing circuitry 1025. The PCF node 101 is operative to perform the actions described herein in relation to the PCF node 101, e.g., in FIGS. 3, 4*a*, 4*b* and 5.

To perform the method steps shown in FIGS. 3, 4*a*, 4*b* and 6 for enabling user plane traffic classification in a communications system 100 supporting CUPS with multiple UPF nodes 105, the SMF node 103 may comprise an arrangement as shown in FIG. 200*a* or FIG. 200*b*, or both.

The SMF node 103 is adapted to, e.g. by means of a transmitting unit 2001, transmit, to a PCF node 101, a policy request fora UE 114.

The SMF node 103 is adapted to, e.g. by means of a receiving unit 2003, receive, from the PCF node 101, a policy response comprising an indicator indicating COMU for the UE 114. The policy response may comprise control rules for applications.

The SMF node 103 is adapted to, e.g. by means of the transmitting unit 2001, transmit, to a first UPF node 105*a*, a first detection rule to classify application traffic, first instructions rules to be applied to the classified application traffic and, based at least on the indicator indicating COMU, a class identifier to identify the classified application traffic towards a next UPF node 105*b*. The class identifier may be a Class-ID Enrichment IE comprised in a Forwarding Parameters IE in a FAR. The application traffic may be user plane traffic.

The SMF node 103 is adapted to, e.g. by means of the transmitting unit 2001, transmit, to a next UPF node 105*b*, next detection rules to classify application traffic, next instructions rules for each next detection rule and to be applied to the classified application traffic and, based at least on the indicator indicating COMU, a class indicator indicating to classify an application traffic received from the first UPF node 105*a* in accordance with the class identifier. The class indicator may be a PDI comprised in a Create PDR IE, or the class indicator may be a part of a Class Detection Rule.

The SMF node 103 may be adapted to, e.g. by means of the receiving unit 2003, receive a COMU capability from at least one of the first UPF node 105*a* and the next UPF node 105*b*. The COMU capability may comprise at least one of the class identifier and the class indicator.

The SMF node 103 may be adapted to, e.g. by means of a selecting unit 2005, select the at least one of the first UPF node 105*a* and the next UPF node 105*b* based on the received COMU capability.

The present mechanism performed by the SMF node 103 may be implemented through one or more processors, such as a processor 2010 in the SMF node 103 depicted in FIG. 200*a*, together with computer program code for performing the functions and actions described herein. A processor may be understood to be a hardware component. The program code mentioned above may also be provided as a computer program product, for instance in the form of a data carrier carrying computer program code for performing the methods described herein when being loaded into the SMF node 103. One such carrier may be in the form of a CD ROM disc. It is however feasible with other data carriers such as a memory stick. The computer program code may furthermore be provided as pure program code on a server and downloaded to the SMF node 103.

The SMF node 103 may comprise a memory 2013 comprising one or more memory units. The memory 2013 is arranged to be used to store obtained information, store data, configurations, schedulings, and applications etc. to perform the methods herein when being executed in the SMF node 103.

The SMF node 103 may receive information from, e.g. the PCF node 101, the first UPF node 105*a*, the next UPF node 105*b*, through a receiving port 2015. The receiving port 2015 may be connected to one or more antennas in SMF node 103. The SMF node 103 may receive information from another structure in the communications system 100 through the receiving port 2015. Since the receiving port 2015 may be in communication with the processor 2010, the receiving port 2015 may then send the received information to the processor 2010. The receiving port 2015 may also be configured to receive other information.

The processor 2010 in the SMF node 103 may be further configured to transmit or send information to e.g. the PCF node 101, the first UPF node 105*a*, the next UPF node 105*b*, or another structure in the communications system 100, through a sending port 2018, which may be in communication with the processor 2010, and the memory 2013.

The SMF node 103 may comprise the transmitting unit 2001, the receiving unit 2003, the selecting unit 2005, other units 2008 etc., as described above. The transmitting unit 2001, the receiving unit 2003, the selecting unit 2005, other units 2008 described above may refer to a combination of analog and digital circuits, and/or one or more processors configured with software and/or firmware, e.g., stored in memory, that, when executed by the one or more processors such as the processor 2010, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 2001-2008 described above may be implemented as one or more applications running on one or more processors such as the processor 2010.

The methods described herein for the SMF node 103 may be respectively implemented by means of a computer program 2020 product, comprising instructions, i.e., software code portions, which, when executed on at least one processor 2010, cause the at least one processor 2010 to carry out the actions described herein, as performed by the SMF node 103. The computer program 2020 product may be stored on a computer-readable storage medium 2023. The computer-readable storage medium 2023, having stored thereon the computer program 2020, may comprise instructions which, when executed on at least one processor 2010, cause the at least one processor 2010 to carry out the actions described herein, as performed by the SMF node 103. The computer-readable storage medium 2023 may be a non-transitory computer-readable storage medium, such as a CD ROM disc, or a memory stick. The computer program 2020 product may be stored on a carrier comprising the computer program 2020 just described. The carrier is one of an electronic signal, optical signal, radio signal, or the first computer-readable storage medium 2023, as described above.

The SMF node 103 may comprise a communication interface configured to facilitate communications between the SMF node 103 and other nodes or devices, e.g., the PCF node 101, the first UPF node 105*a*, the next UPF node 105*b*, or another structure. The interface may comprise a transceiver configured to transmit and receive radio signals over an air interface in accordance with a suitable standard.

The SMF node 103 may comprise the arrangement depicted in FIG. 200*b*. The SMF node 103 may comprise a processing circuitry 2025, e.g., one or more processors such as the processor 2010, in the SMF node 103 and the memory 2013. The SMF node 103 may also comprise a radio circuitry 2028, which may comprise e.g., the receiving port 2015 and the sending port 2018. The processing circuitry 2025 may be configured to, or operable to, perform the method actions according to FIGS. 3, 4*a*, 4*b* and 6 in a similar manner as that described in relation to FIG. 200*a*.

The radio circuitry 2028 may be configured to set up and maintain at least a wireless connection with the SMF node 103. Circuitry may be understood herein as a hardware component.

The SMF node 103 is operative to operate in the communications system 100. The SMF node 103 may comprise the processing circuitry 2025 and the memory 2013. The memory 2013 comprises instructions executable by the processing circuitry 2025. The SMF node 103 is operative to perform the actions described herein in relation to the SMF node 103, e.g., in FIGS. 3, 4*a*, 4*b* and 6.

To perform the method steps shown in FIGS. 3, 4*a*, 4*b* and 7 for enabling user plane traffic classification in a communications system 100 supporting CUPS with multiple UPF nodes 105, the first UPF node 105*a* may comprise an arrangement as shown in FIG. 300*a* or FIG. 300*b*, or both.

The first UPF node 105*a* is adapted to, e.g. by means of a receiving unit 3001, receive, from a SMF node 103, a first detection rule to classify application traffic, first instructions rules to be applied to the classified application traffic and a class identifier to identify the classified application traffic towards a next UPF node 105*b*. The application traffic may be user plane traffic.

The first UPF node 105*a* is adapted to, e.g. by means of a detecting unit 3003, detect the application traffic with the first detection rule.

The first UPF node 105*a* is adapted to, e.g. by means of a classifying unit 3005, classify the application traffic in accordance with the first detection rule.

The first UPF node 105*a* is adapted to, e.g. by means of an applying unit 3008, apply the first instruction rules to the classified application traffic.

The first UPF node 105*a* is adapted to, e.g. by means of a forwarding unit 3010, forward the application traffic toward the next UPF node 105*b* along with the class identifier identifying a classification result.

The first UPF node 105*a* may be adapted to, e.g. by means of a transmitting unit 3013, transmit a COMU capability to the SMF node 103. The COMU capability may comprise at least one of the class identifier and a class indicator.

The present mechanism performed by the first UPF node 105*a* may be implemented through one or more processors, such as a processor 3020 in the first UPF node 105*a* depicted in FIG. 300*a*, together with computer program code for performing the functions and actions described herein. A processor may be understood to be a hardware component. The program code mentioned above may also be provided as a computer program product, for instance in the form of a data carrier carrying computer program code for performing the methods described herein when being loaded into the first UPF node 105*a*. One such carrier may be in the form of a CD ROM disc. It is however feasible with other data carriers such as a memory stick. The computer program code may furthermore be provided as pure program code on a server and downloaded to the first UPF node 105*a*.

The first UPF node 105*a* may comprise a memory 3023 comprising one or more memory units. The memory 3023 is arranged to be used to store obtained information, store data, configurations, schedulings, and applications etc. to perform the methods herein when being executed in the first UPF node 105*a*.

The first UPF node 105*a* may receive information from, e.g. the PCF node 101, the SMF node 103, the next UPF node 105*b*, through a receiving port 3025. The receiving port 3025 may be connected to one or more antennas in first UPF node 105*a*. The first UPF node 105*a* may receive information from another structure in the communications system 100 through the receiving port 3025. Since the receiving port 3025 may be in communication with the processor 3020, the receiving port 3025 may then send the received information to the processor 3020. The receiving port 3025 may also be configured to receive other information.

The processor 3020 in the first UPF node 105a may be further configured to transmit or send information to e.g. the PCF node 101, the SMF node 103, the next UPF node 105b, or another structure in the communications system 100, through a sending port 3028, which may be in communication with the processor 3020, and the memory 3023.

The first UPF node 105a may comprise the receiving unit 3001, the detecting unit 3003, the classifying unit 3005, the applying unit 3008, the forwarding unit 3010, the transmitting unit 3013, other units 3015 etc., as described above.

The receiving unit 3001, the detecting unit 3003, the classifying unit 3005, the applying unit 3008, the forwarding unit 3010, the transmitting unit 3013, other units 3015 described above may refer to a combination of analog and digital circuits, and/or one or more processors configured with software and/or firmware, e.g., stored in memory, that, when executed by the one or more processors such as the processor 3020, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 3001-3015 described above may be implemented as one or more applications running on one or more processors such as the processor 3020.

The methods described herein for the first UPF node 105a may be respectively implemented by means of a computer program 3030 product, comprising instructions, i.e., software code portions, which, when executed on at least one processor 3020, cause the at least one processor 3020 to carry out the actions described herein, as performed by the first UPF node 105a. The computer program 3030 product may be stored on a computer-readable storage medium 3033. The computer-readable storage medium 3033, having stored thereon the computer program 3030, may comprise instructions which, when executed on at least one processor 3020, cause the at least one processor 3020 to carry out the actions described herein, as performed by the first UPF node 105a.

The computer-readable storage medium 3033 may be a non-transitory computer-readable storage medium, such as a CD ROM disc, or a memory stick. The computer program 3030 product may be stored on a carrier comprising the computer program 3030 just described. The carrier is one of an electronic signal, optical signal, radio signal, or the first computer-readable storage medium 3033, as described above.

The first UPF node 105a may comprise a communication interface configured to facilitate communications between the first UPF node 105a and other nodes or devices, e.g., the PCF node 101, the SMF node 103, the next UPF node 105b, or another structure. The interface may comprise a transceiver configured to transmit and receive radio signals over an air interface in accordance with a suitable standard.

The first UPF node 105a may comprise the arrangement depicted in FIG. 300b. The first UPF node 105a may comprise a processing circuitry 3035, e.g., one or more processors such as the processor 3020, in the first UPF node 105a and the memory 3023. The first UPF node 105a may also comprise a radio circuitry 3038, which may comprise e.g., the receiving port 3025 and the sending port 3028. The processing circuitry 3035 may be configured to, or operable to, perform the method actions according to FIGS. 3, 4a, 4b and 7 in a similar manner as that described in relation to FIG. 300a. The radio circuitry 3038 may be configured to set up and maintain at least a wireless connection with the SMF node 103, the PCF node 101 and the next UPF node 105b. Circuitry may be understood herein as a hardware component.

The first UPF node 105a is operative to operate in the communications system 100. The first UPF node 105a may comprise the processing circuitry 3035 and the memory 3023.

The memory 3023 comprises instructions executable by the processing circuitry 3035. The first UPF node 105a is operative to perform the actions described herein in relation to the first UPF node 105a, e.g., in FIGS. 3, 4a, 4b and 7.

Figures 400A, 400B:
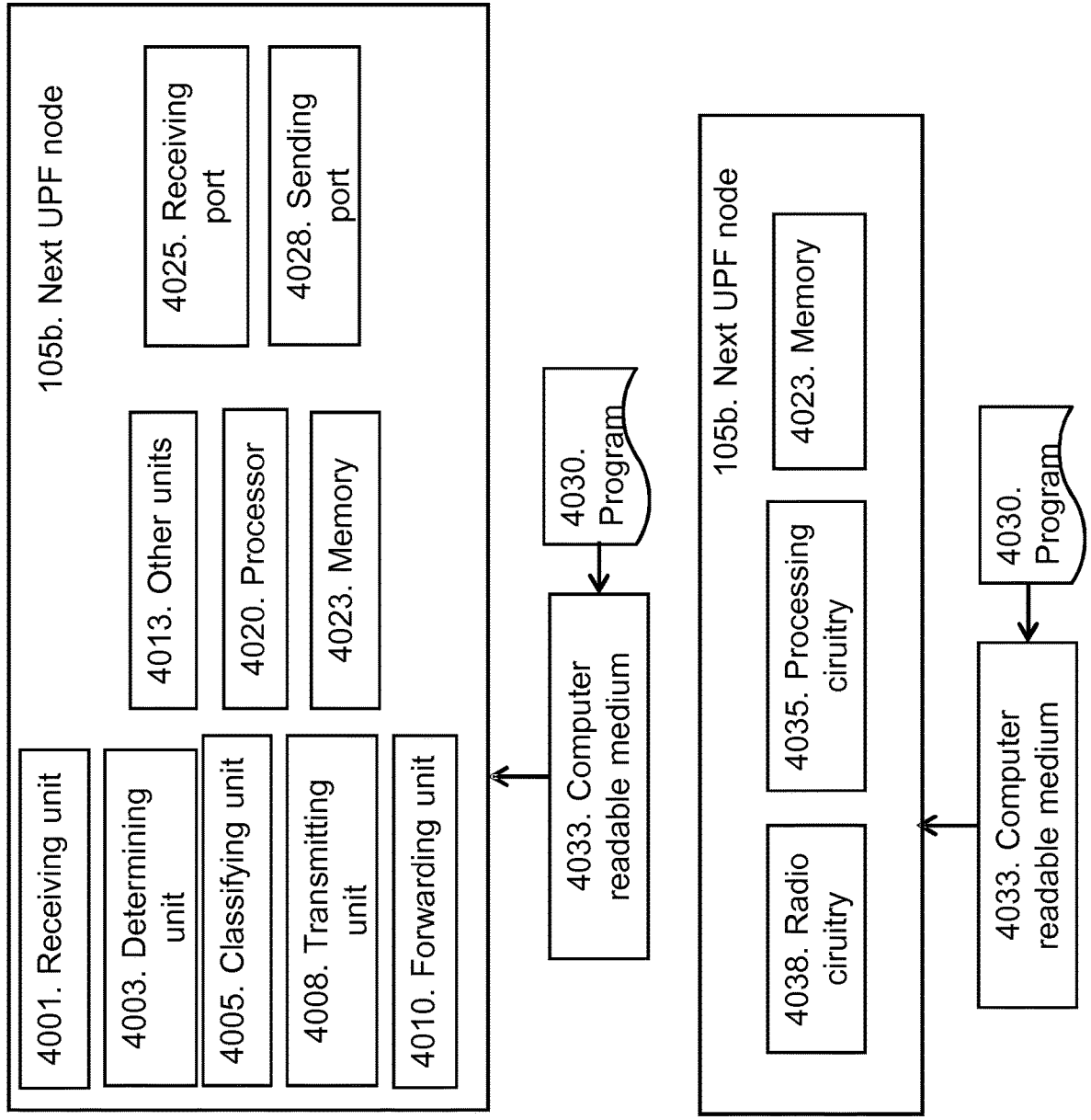
FIG. 400a-400b are schematic drawings illustrating a next UPF node.

To perform the method steps shown in FIGS. 3, 4a, 4b and 8 for enabling user plane traffic classification in a communications system 100 supporting CUPS with multiple UPF nodes 105, the next UPF node 105b may comprise an arrangement as shown in FIG. 400a or FIG. 400b, or both.

The next UPF node 105b is adapted to, e.g. by means of a receiving unit 4001, receive, from a SMF node 103, next detection rules to classify application traffic, next instructions rules for each next detection rule and to be applied to the classified application traffic, and a class indicator indicating to classify an application traffic received from a first UPF node 105a in accordance with a class identifier identifying a classification result. The application traffic may be user plane traffic.

The next UPF node 105b is adapted to, e.g. by means of the receiving unit 4001, receive the application traffic from the first UPF node 105a along with the class identifier identifying the classification result. The application traffic along with the class identifier identifying the classification result may be comprised in an IP packet encapsulated in a GTP-U header.

The next UPF node 105b is adapted to, e.g. by means of a determining unit 4003, based on the class indicator, determine a second detection rule amongst the next detection rules. The second detection rule matches the classification result identified in the class identifier.

The next UPF node 105b is adapted to, e.g. by means of a classifying unit 4005, classify the received application traffic in accordance with the second detection rule and applying instruction rules for the second detection rule to the received application traffic.

The next UPF node 105b may be adapted to, e.g. by means of a transmitting unit 4008, transmit a COMU capability to the SMF node 103. The COMU capability may comprise at least one of a class identifier and the class indicator.

The next UPF node 105b may be adapted to, e.g. by means of a forwarding unit 4010. forward the application traffic to an AS 125.

The present mechanism performed by the next UPF node 105b may be implemented through one or more processors, such as a processor 4020 in the next UPF node 105b depicted in FIG. 400a, together with computer program code for performing the functions and actions described herein. A processor may be understood to be a hardware component. The program code mentioned above may also be provided as a computer program product, for instance in the form of a data carrier carrying computer program code for performing the methods described herein when being loaded into the next UPF node 105b. One such carrier may be in the form of a CD ROM disc. It is however feasible with other data carriers such as a memory stick. The computer program code may furthermore be provided as pure program code on a server and downloaded to the next UPF node 105*b*.

The next UPF node 105*b* may comprise a memory 4023 comprising one or more memory units. The memory 4023 is arranged to be used to store obtained information, store data, configurations, schedulings, and applications etc. to perform the methods herein when being executed in the next UPF node 105*b*.

The next UPF node 105*b* may receive information from, e.g. the PCF node 101, the SMF node 103, the first UPF node 105*a*, through a receiving port 4025. The receiving port 4025 may be connected to one or more antennas in next UPF node 105*b*. The next UPF node 105*b* may receive information from another structure in the communications system 100 through the receiving port 4025. Since the receiving port 4025 may be in communication with the processor 4020, the receiving port 4025 may then send the received information to the processor 4020. The receiving port 4025 may also be configured to receive other information.

The processor 4020 in the next UPF node 105*b* may be further configured to transmit or send information to e.g. the PCF node 101, the SMF node 103, the first UPF node 105*a*, or another structure in the communications system 100, through a sending port 4028, which may be in communication with the processor 4020, and the memory 4023.

The next UPF node 105*b* may comprise the receiving unit 4001, the determining unit 4003, the classifying unit 4005, the transmitting unit 4008, the forwarding unit 4010, other units 4013 etc., as described above.

The receiving unit 4001, the determining unit 4003, the classifying unit 4005, the transmitting unit 4008, the forwarding unit 4010, other units 4013 described above may refer to a combination of analog and digital circuits, and/or one or more processors configured with software and/or firmware, e.g., stored in memory, that, when executed by the one or more processors such as the processor 4020, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 4001-413 described above may be implemented as one or more applications running on one or more processors such as the processor 4020.

The methods described herein for the next UPF node 105*b* may be respectively implemented by means of a computer program 4030 product, comprising instructions, i.e., software code portions, which, when executed on at least one processor 4020, cause the at least one processor 4020 to carry out the actions described herein, as performed by the next UPF node 105*b*. The computer program 4030 product may be stored on a computer-readable storage medium 4033. The computer-readable storage medium 4033, having stored thereon the computer program 4030, may comprise instructions which, when executed on at least one processor 4020, cause the at least one processor 4020 to carry out the actions described herein, as performed by the next UPF node 105*b*. The computer-readable storage medium 4033 may be a non-transitory computer-readable storage medium, such as a CD ROM disc, or a memory stick. The computer program 4030 product may be stored on a carrier comprising the computer program 4030 just described. The carrier is one of an electronic signal, optical signal, radio signal, or the first computer-readable storage medium 4033, as described above.

The next UPF node 105*b* may comprise a communication interface configured to facilitate communications between the next UPF node 105*b* and other nodes or devices, e.g., the PCF node 101, the SMF node 103, the first UPF node 105*a*, or another structure. The interface may comprise a transceiver configured to transmit and receive radio signals over an air interface in accordance with a suitable standard.

The next UPF node 105*b* may comprise the arrangement depicted in FIG. 400*b*. The next UPF node 105*b* may comprise a processing circuitry 4035, e.g., one or more processors such as the processor 4020, in the next UPF node 105*b* and the memory 4023. The next UPF node 105*b* may also comprise a radio circuitry 4038, which may comprise e.g., the receiving port 4025 and the sending port 4028. The processing circuitry 4035 may be configured to, or operable to, perform the method actions according to FIGS. 3, 4*a*, 4*b* and 8 in a similar manner as that described in relation to FIG. 400*a*. The radio circuitry 4038 may be configured to set up and maintain at least a wireless connection with the SMF node 103, the PCF node 101 and the first UPF node 105*a*. Circuitry may be understood herein as a hardware component.

The next UPF node 105*b* is operative to operate in the communications system 100. The next UPF node 105*b* may comprise the processing circuitry 4035 and the memory 4023. The memory 4023 comprises instructions executable by the processing circuitry 4035. The next UPF node 105*b* is operative to perform the actions described herein in relation to the next UPF node 105*b*, e.g., in FIGS. 3, 4*a*, 4*b* and 8.

In summary, the PFCP protocol for the SMF node 103 is extended to indicate to the first UPF node 105*a* and the next UPF node 105*b* to apply COMU in a scenario of multiple UPFs 105, in the context of 5G networks supporting CUPS.

This disclosure relates to packet core in 5G. The disclosure also relates to policy, e.g. application traffic analysis and/or application traffic classification, in the context of 3GPP CUPS.

The user plane traffic classification in a scenario of multiple UPFs 105 is optimized by extending the 3GPP PFCP protocol with at least one of the following:

A COMU capability in the PFCP Association procedure.

A class identifier, e.g. a Class-ID Enrichment IE in the Forwarding Parameters IE in FAR at PFCP Session Establishment/Modification Request, for the SMF node 103 to indicate to the first UPF 105*a* to convey the class indicator, e.g. Class-ID, to the next UPF node 105*b*.

A class indicator, e.g. a PDI type, Class-ID in the Create PDR IE within PFCP Session Establishment/Modification Request, for the SMF node 103 to indicate to the first UPF 105*a* to match incoming application traffic based on the class indicator, e.g. Class-ID.

The present disclosure is not limited to the above description. Various alternatives, modifications and equivalents may be used. Therefore, the above disclosure should not be taken as limiting the scope, which is defined by the appended claims. A feature may be combined with one or more other features disclosed herein.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may be performed in another order than the order in which they appear in the claims.

The invention claimed is:

1. A method performed by a Policy Control Function (PCF) node for enabling user plane traffic classification in a communications system supporting Control and User Plane Separation (CUPS) with multiple User Plane Function (UPF) nodes, the method comprising:
   receiving, from a Session Management Function (SMF) node, a policy request for a User Equipment, UE;
   obtaining, from a Unified Data Repository (UDR) an indicator indicating Classification Optimization for Multiple User plane functions (COMU) for the UE; and
   transmitting, to the SMF node, a policy response comprising the indicator indicating COMU.

2. The method of claim 1, wherein a profile for the UE is obtained together with the indicator indicating COMU.

3. A method performed by a Session Management Function (SMF) node for enabling user plane traffic classification in a communications system supporting Control Plane User Plane Separation (CUPS) with multiple User Plane Function (UPF) nodes, the method comprising:
   transmitting, to a Policy Control Function (PCF) node, a policy request for a User Equipment, UE;
   receiving, from the PCF node, a policy response comprising an indicator indicating Classification Optimization for Multiple User plane functions (COMU) for the UE;
   transmitting, to a first UPF node, a first detection rule to classify application traffic, first instructions rules to be applied to the classified application traffic and, based at least on the indicator indicating COMU, a class identifier to identify the classified application traffic towards a next UPF node; and
   transmitting, to a next UPF node, next detection rules to classify application traffic, next instructions rules for each next detection rule and to be applied to the classified application traffic and, based at least on the indicator indicating COMU, a class indicator indicating to classify an application traffic received from the first UPF node in accordance with the class identifier.

4. The method of claim 3, comprising:
   receiving a COMU capability from at least one of the first UPF node and the next UPF node; and
   selecting the at least one of the first UPF node and the next UPF node based on the received COMU capability.

5. The method of claim 4, wherein the COMU capability comprises at least one of the class identifier and the class indicator.

6. The method of claim 4, wherein at least one of the transmitted class identifier and class indicator is based on the received COMU capability.

7. The method of claim 3, wherein the class identifier is a Class-ID Enrichment Information Element (IE) comprised in a Forwarding Parameters IE in a Forwarding Action Rule (FAR).

8. The method of claim 3, wherein the class indicator is a Packet Detection Information (PDI) Information (IE) comprised in a Create Packet Detection Rule (PDR) Information Element (IE) or wherein the class indicator is a part of a Class Detection Rule.

9. A method performed by a first User Plane Function (UPF) node for enabling user plane traffic classification in a communications system supporting Control Plane User Plane Separation (CUPS) with multiple UPF nodes, the method comprising:
   receiving, from a Session Management Function (SMF) node a first detection rule to classify application traffic, first instructions rules to be applied to the classified application traffic and a class identifier to identify the classified application traffic towards a next UPF node;
   detecting the application traffic with the first detection rule;
   classifying the application traffic in accordance with the first detection rule;
   applying the first instruction rules to the classified application traffic, and
   forwarding the application traffic toward the next UPF node along with the class identifier identifying a classification result.

10. The method of claim 9, comprising:
    transmitting a COMU capability to the SMF node.

11. The method of claim 10, wherein the COMU capability comprises at least one of the class identifier and a class indicator.

12. The method of claim 9, wherein the application traffic along with the class identifier identifying a classification result is comprised in an Internet Protocol (IP) packet encapsulated in a General Packet Radio System Tunneling Protocol-User Plane (GTP-U) header.

13. A method performed by a next User Plane Function (UPF) node for enabling user plane traffic classification in a communications system supporting Control Plane User Plane Separation (CUPS) with multiple UPF nodes, the method comprising:
    receiving, from a Session Management Function (SMF) node, next detection rules to classify application traffic, next instructions rules for each next detection rule and to be applied to the classified application traffic, and a class indicator indicating to classify an application traffic received from a first UPF node in accordance with a class identifier identifying a classification result;
    receiving the application traffic from the first UPF node along with the class identifier identifying the classification result;
    based on the class indicator, determining a second detection rule amongst the next detection rules, wherein the second detection rule matches the classification result identified in the class identifier; and
    classifying the received application traffic in accordance with the second detection rule and applying instruction rules for the second detection rule to the received application traffic.

14. The method of claim 13, comprising:
    transmitting a COMU capability to the SMF node.

15. The method of claim 14, wherein the COMU capability comprises at least one of a class identifier and the class indicator.

16. The method of claim 13, comprising:
    forwarding the application traffic to an Application Server, AS.

17. A Session Management Function (SMF) node for enabling user plane traffic classification in a communications system supporting Control Plane User Plane Separation (CUPS) with multiple User Plane Function (UPF) nodes, the SMF comprising:
communication interface circuitry configured to communicate with the multiple UPF nodes and a Policy Control Function (PCF) node; and
processing circuitry and memory operatively coupled to the communication interface circuitry and configured to control the communication interface circuitry to:
transmit, to a Policy Control Function (PCF) node, a policy request for a User Equipment, UE;
receive, from the PCF node, a policy response comprising an indicator indicating Classification Optimization for Multiple User plane functions (COMU) for the UE;
transmit, to a first UPF node, a first detection rule to classify application traffic, first instructions rules to be applied to the classified application traffic and, based at least on the indicator indicating COMU, a class identifier to identify the classified application traffic towards a next UPF node; and
transmit, to a next UPF node, next detection rules to classify application traffic, next instructions rules for each next detection rule and to be applied to the classified application traffic and, based at least on the indicator indicating COMU, a class indicator indicating to classify an application traffic received from the first UPF node in accordance with the class identifier.

18. The SMF node of claim 17, wherein the processing circuitry and memory are further configured to control the communication interface circuitry to:
receive a COMU capability from at least one of the first UPF node and the next UPF node; and
select the at least one of the first UPF node and the next UPF node based on the received COMU capability.

19. The SMF node of claim 18, wherein the COMU capability comprises at least one of the class identifier and the class indicator.

20. The SMF node of claim 18, wherein at least one of the transmitted class identifier and class indicator is based on the received COMU capability.

* * * * *